United States Patent [19]

Takeishi et al.

[11] Patent Number: 5,689,525
[45] Date of Patent: Nov. 18, 1997

[54] DIRECT-SEQUENCE SPREAD-SPECTRUM COMMUNICATION SYSTEM

[75] Inventors: Minako Takeishi, Kawasaki; Ken Ikeda, Tokyo; Kenichi Takahashi, Kawasaki, all of Japan

[73] Assignee: Matsushita Electric Industrial Co., Ltd., Osaka, Japan

[21] Appl. No.: 511,271

[22] Filed: Aug. 4, 1995

[30] Foreign Application Priority Data

Aug. 11, 1994 [JP] Japan .................................. 6-189491

[51] Int. Cl.$^6$ .................................................. H04K 1/00
[52] U.S. Cl. .......................... 375/206; 370/342; 375/208
[58] Field of Search .................................... 375/371, 373, 375/375, 376, 358, 206, 208–210; 370/320, 342, 335; 455/84–86, 74, 53.1, 56.1

[56] References Cited

U.S. PATENT DOCUMENTS

| 3,947,634 | 3/1976 | Betts | 375/367 |
|---|---|---|---|
| 4,455,651 | 6/1984 | Baran | 370/320 |
| 4,759,034 | 7/1988 | Nagazumi | 375/208 |
| 5,245,612 | 9/1993 | Kachi et al. | 375/367 |
| 5,265,119 | 11/1993 | Gilhousen et al. | 370/342 |
| 5,467,367 | 11/1995 | Izumi et al. | 375/206 |
| 5,533,011 | 7/1996 | Dean et al. | 370/342 |
| 5,550,811 | 8/1996 | Kaku et al. | 370/342 |
| 5,590,160 | 12/1996 | Ostman | 375/367 |

*Primary Examiner*—Tesfaldet Bocure
*Attorney, Agent, or Firm*—Lowe, Price, LeBlanc & Becker

[57] ABSTRACT

A clock signal generator produces a basic clock signal. A variable delay device is operative for delaying the basic clock signal by an adjustable interval and thereby converting the basic clock signal into a delay-resultant clock signal. A pseudo-noise code is generated at a timing depending on the delay-resultant clock signal. A spread-spectrum information signal is despread into a non-spread information signal in response to the pseudo-noise code. A correlator detects a correlation between the spread-spectrum information signal and the pseudo-noise code. The adjustable interval provided by the variable delay device is controlled in response to the detected correlation to provide synchronization between the spread-spectrum information signal and the pseudo-noise code.

8 Claims, 10 Drawing Sheets

DIRECT-SEQUENCE SPREAD-SPECTRUM COMMUNICATION SYSTEM

BACKGROUND OF THE INVENTION

1. Field of the Invention

This invention relates to a direct-sequence spread-spectrum communication system.

2. Description of the Prior Art

In a typical CDMA (code division multiple access) communication network, a base station can communicate with terminal stations to which different pseudo-noise codes (spread codes) are assigned respectively. The terminal stations are, for example, subscriber stations or mobile stations. In the base station, base-band information pieces to be transmitted to the terminal stations are modulated in response to the pseudo-noise codes respectively before being combined and multiplexed into a composite spread-spectrum information signal. Then, a carrier is modulated in response to the composite spread-spectrum information signal. The base station transmits the resultant modulated carrier toward the terminal stations via a downlink. Each of the terminal stations receives the modulated carrier. In each of the terminal stations, the composite spread-spectrum information signal is recovered from the received carrier, and then the composite spread-spectrum information signal is demodulated into the related base-band information piece in response to the assigned pseudo-noise code.

Each of the terminal stations includes a generator for producing the assigned pseudo-noise code. To accurately recover the related base-band information piece, it is necessary to acquire and maintain the synchronization between the produced pseudo-noise code and the pseudo-noise code components of the composite spread-spectrum information signal.

In each of the terminal stations, a base-band information piece to be transmitted to the base station is modulated into a spread-spectrum information signal in response to the assigned pseudo-noise code. Then, a carrier is modulated in response to the spread-spectrum information signal. The terminal station transmits the resultant modulated carrier toward the base station via an uplink. The base station receives the modulated carrier. In the base station, the spread-spectrum information signal is recovered from the received carrier. The base station has despreading sections which use the pseudo-noise codes assigned to the terminal stations respectively. In each of the despreading sections, the spread-spectrum information signal is demodulated into the base-band information piece in response to the related pseudo-noise code.

In each of the despreading sections of the base station, to accurately recover the base-band information piece transmitted from the corresponding terminal station, it is necessary to acquire and maintain the synchronization between the used pseudo-noise code and the pseudo-noise code components of the spread-spectrum information signal.

Accordingly, the base station generally includes an arrangement for acquiring and maintaining the synchronizations with information signals transmitted from the terminal stations. Such a synchronization acquiring and tracking arrangement tends to be complicated in structure.

SUMMARY OF THE INVENTION

It is an object of this invention to provide an improved direct-sequence spread-spectrum communication system.

A first aspect of this invention provides a receiver in a base station of a direct-sequence spread-spectrum communication system which comprises a clock signal generator producing a basic clock signal; first means connected to the clock signal generator for delaying the basic clock signal by an adjustable interval and thereby converting the basic clock signal into a delay-resultant clock signal; second means connected to the first means for generating a pseudo-noise code at a timing depending on the delay-resultant clock signal; third means connected to the second means for despreading a spread-spectrum information signal into a non-spread information signal in response to the pseudo-noise code generated by the second means; fourth means connected to the second means for detecting a correlation between the spread-spectrum information signal and the pseudo-noise code generated by the second means; and fifth means connected to the first means and the fourth means for controlling the adjustable interval in response to the correlation detected by the fourth means to provide synchronization between the spread-spectrum information signal and the pseudo-noise code generated by the second means.

A second aspect of this invention provides a receiver in a base station of a direct-sequence spread-spectrum communication system which comprises a clock signal generator producing a basic clock signal; first means connected to the clock signal generator for delaying the basic clock signal by a first adjustable interval and thereby converting the basic clock signal into a first delay-resultant clock signal; second means connected to the first means for generating a first pseudo-noise code at a timing depending on the first delay-resultant clock signal; third means connected to the second means for despreading a spread-spectrum information signal into a first non-spread information signal in response to the first pseudo-noise code generated by the second means; fourth means connected to the second means for detecting a correlation between the spread-spectrum information signal and the first pseudo-noise code generated by the second means; fifth means connected to the first means and the fourth means for controlling the first adjustable interval in response to the correlation detected by the fourth means to provide synchronization between the spread-spectrum information signal and the first pseudo-noise code generated by the second means; sixth means connected to the clock signal generator for delaying the basic clock signal by a second adjustable interval and thereby converting the basic clock signal into a second delay-resultant clock signal; seventh means connected to the sixth means for generating a second pseudo-noise code at a timing depending on the second delay-resultant clock signal; eighth means connected to the seventh means for despreading the spread-spectrum information signal into a second non-spread information signal in response to the second pseudo-noise code generated by the seventh means; ninth means connected to the seventh means for detecting a correlation between the spread-spectrum information signal and the second pseudo-noise code generated by the seventh means; and tenth means connected to the sixth means and the ninth means for controlling the second adjustable interval in response to the correlation detected by the ninth means to provide synchronization between the spread-spectrum information signal and the second pseudo-noise code generated by the seventh means.

A third aspect of this invention provides a direct-sequence spread-spectrum communication system comprising a base station; and a terminal performing direct-sequence spread-spectrum communication with the base station by using code division multiple access; the terminal including a receiving section, a transmitting section, and a controlling section, wherein the receiving section in the terminal includes a synchronization tracking circuit for reproducing a code clock signal on the basis of a signal received from the base station, wherein the transmitting section in the terminal transmits a signal on the basis of the reproduced code clock signal, and wherein the controlling section in the terminal controls the receiving section and the transmitting section in the terminal and performs signal processing; the base station including a transmitting section and a synchronization tracking circuit, wherein the transmitting section in the base station transmits a signal by using a self reference clock signal, wherein the synchronization tracking circuit in the base station performs clock signal reproduction, and wherein the synchronization tracking circuit in the base station includes a delay circuit for delaying the self reference clock signal to maximize a correlation between a received signal and a reference code.

A fourth aspect of this invention is based on the third aspect thereof, and provides a direct-sequence spread-spectrum communication system wherein the receiving section in the base station includes receiving circuits corresponding to terminals respectively, and each of the receiving circuits includes a delay circuit for delaying a base-station reference clock signal to maximize a correlation between a received signal and a reference code.

A fifth aspect of this invention is based on the third aspect thereof, and provides a direct-sequence spread-spectrum communication system wherein the delay circuit includes a plurality of sub delay circuits and means for selecting one of output signals of the sub delay circuits and changing the signal selection to vary a delay amount.

A sixth aspect of this invention is based on the third aspect thereof, and provides a direct-sequence spread-spectrum communication system wherein the delay circuit provides a variable delay amount and includes a sub delay circuit of a variable delay type and a waveform processing circuit following the sub delay circuit.

A seventh aspect of this invention is based on the third aspect thereof, and provides a direct-sequence spread-spectrum communication system wherein the delay circuit provides a variable delay amount and includes a low pass filter having a variable time constant and a waveform shaping circuit following the low pass filter.

An eighth aspect of this invention provides a direct-sequence spread-spectrum communication system comprising a base station; and a terminal performing direct-sequence spread-spectrum communication with the base station by using code division multiple access; the terminal including a receiving section, a transmitting section, and a controlling section, wherein the receiving section in the terminal includes a synchronization tracking circuit for reproducing a code clock signal on the basis of a signal received from the base station, wherein the transmitting section in the terminal transmits a signal on the basis of the reproduced code clock signal, and wherein the controlling section in the terminal controls the receiving section and the transmitting section in the terminal and performs signal processing; the base station including a transmitting section and a synchronization tracking circuit, wherein the transmitting section in the base station transmits a signal by using a self reference clock signal, wherein the synchronization tracking circuit in the base station performs clock signal reproduction, and wherein the synchronization tracking circuit in the base station includes a delay circuit and a changing circuit, the delay circuit having a plurality of stages sequentially delaying the self reference clock signal, the changing circuit changeably selecting one of output signals from the respective stages of the delay circuit as a clock signal having a timing at which a correlation between a received signal from each terminal and a reference signal is maximized.

A ninth aspect of this invention provides a direct-sequence spread-spectrum communication system comprising a base station; and a terminal performing direct-sequence spread-spectrum communication with the base station by using code division multiple access; the terminal including a receiving section, a transmitting section, and a controlling section, wherein the receiving section in the terminal includes a synchronization tracking circuit for reproducing a code clock signal on the basis of a signal received from the base station, wherein the transmitting section in the terminal transmits a signal on the basis of the reproduced code clock signal, and wherein the controlling section in the terminal controls the receiving section and the transmitting section in the terminal and performs signal processing; the base station including a transmitting section, a receiving section, and a controlling section, wherein the transmitting section in the base station transmits a signal by using a self reference clock signal, wherein the receiving section in the base station includes receiving circuits corresponding to terminals respectively, wherein the receiving section in the base station includes signal processing circuits of a rake type for the receiving circuits respectively, wherein each of the signal processing circuits includes a delay circuit for delaying the self reference clock signal to maximize a correlation between a received signal and a reference code, and wherein the controlling section in the base station controls the receiving section and the transmitting section in the base station and performs signal processing.

A tenth aspect of this invention is based on the ninth aspect thereof, and provides a direct-sequence spread-spectrum communication system wherein each of the signal processing circuits includes a delay circuit for delaying the self reference clock signal to maximize a correlation between a received signal and a reference code, wherein each of the signal processing circuits includes a memory storing information of a delay time related to the clock signal, wherein when a received power or a correlation temporarily drops, a clock signal maintained for the delay time stored in the memory is used by one or more of the signal processing circuits during a predetermined fixed time, wherein the stored delay time and a clock timing are not changed in cases where the received power or the correlation returns to an original level in a given time after dropping temporarily, and wherein a delay time corresponding to a maximum correlation is detected again in cases where the received power or the correlation does not return to an original level in a given time after dropping temporarily.

DESCRIPTION OF THE PREFERRED EMBODIMENTS

First Embodiment

Figure 1:
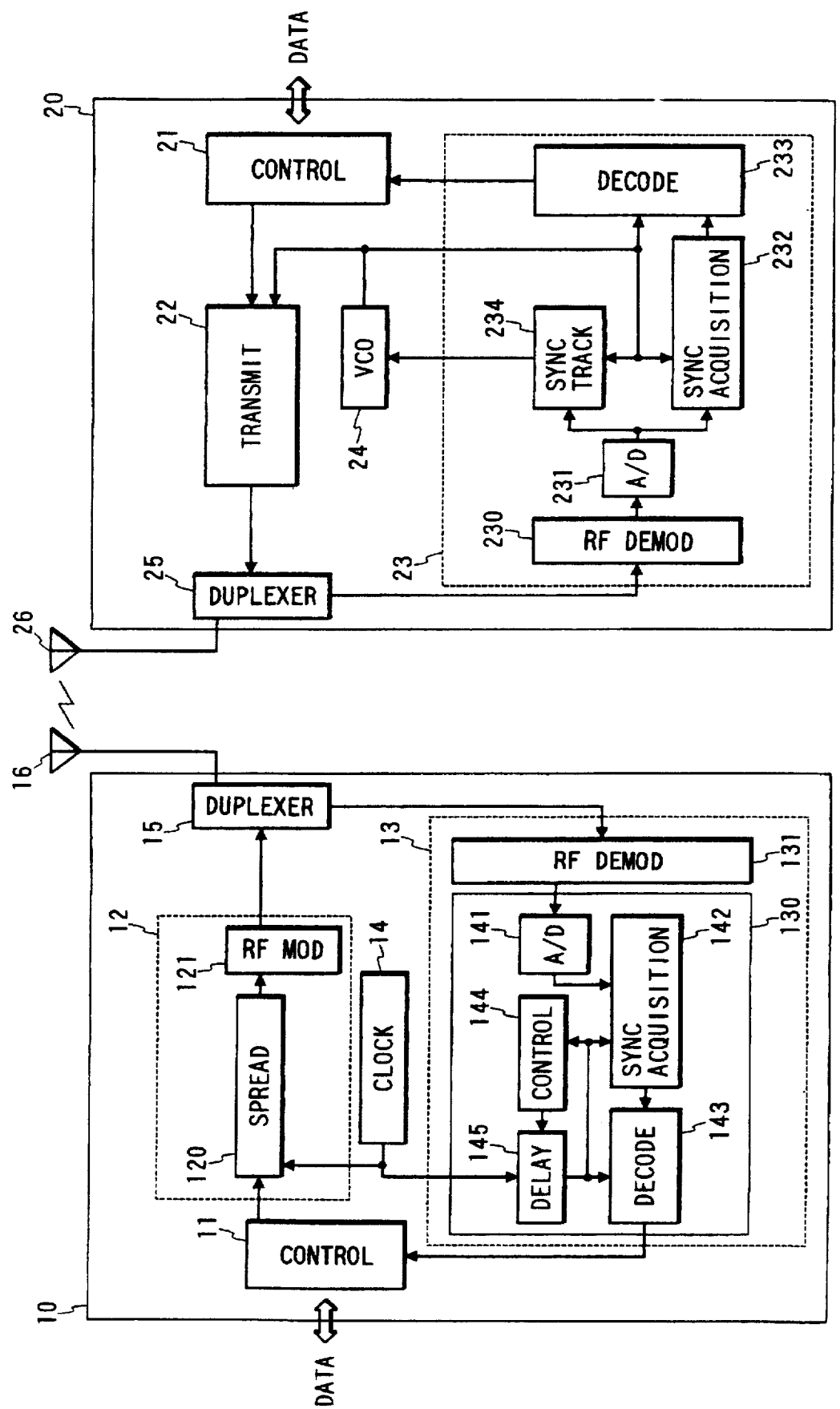
FIG. 1 is a block diagram of a direct-sequence spread-spectrum communication system according to a first embodiment of this invention.

With reference to FIG. 1, a direct-sequence spread-spectrum communication system includes a base station 10 and a terminal station 20 which can communicate with each other.

The base station 10 includes a data controller 11, a transmitter 12, a receiver 13, a clock signal generator 14, a duplexer 15, and an antenna 16.

The transmitter 12 has a spreading circuit 120 and an RF modulator 121. The input side of the spreading circuit 120 is connected to the data controller 11. The output side of the spreading circuit 120 is connected to the input side of the RF modulator 121. The output side of the RF modulator 121 is connected to the antenna 16 via an RF power amplifier (not shown) and the duplexer 15. The spreading circuit 120 is connected to the clock signal generator 14.

The receiver 13 has a detecting circuit 130 and an RF demodulating circuit (an RF demodulator) 131. The input side of the RF demodulating circuit 131 is connected to the antenna 16 via a receiver front end (not shown) and the duplexer 15. The detecting circuit 130 has an A/D converter 141, a sync acquisition circuit 142, a decoding circuit 143, a delay controller 144, and a delay circuit 145. The input side of the A/D converter 141 is connected to the output side of the RF demodulating circuit 131. The output side of the A/D converter 141 is connected to the sync acquisition circuit 142. The sync acquisition circuit 142 is connected to the output side of the delay circuit 145 and the input side of the decoding circuit 143. The output side of the decoding circuit 143 is connected to the data controller 11. The decoding circuit 143 is also connected to the output side of the delay circuit 145. The delay controller 144 is connected to the sync acquisition circuit 142 and the delay circuit 145.

The terminal station 20 includes a data controller 21, a transmitter 22, a receiver 23, a VCO (a voltage controlled oscillator) 24, a duplexer 25, and an antenna 26.

The input side of the transmitter 22 is connected to the data controller 21. The transmitter 22 is connected to the output side of the VCO 24. The output side of the transmitter 22 is connected to the antenna 26 via the duplexer 25.

The receiver 23 has an RF demodulating circuit (an RF demodulator) 230, an A/D converter 231, a sync acquisition circuit 232, a decoding circuit 233, and a sync tracking circuit 234. The input side of the RF demodulating circuit 230 is connected to the antenna 26 via a receiver front end (not shown) and the duplexer 25. The output side of the RF demodulating circuit 230 is connected to the input side of the A/D converter 231. The output side of the A/D converter 231 is connected to the sync acquisition circuit 232 and the sync tracking circuit 234. The input side of the decoding circuit 233 is connected to the sync acquisition circuit 232. The output side of the decoding circuit 233 is connected to the data controller 21. The sync acquisition circuit 232, the decoding circuit 233, and the sync tracking circuit 234 are connected to the output side of the VCO 24.

The transmitting side of the base station 10 operates as follows. The base station 10 receives input data which should be transmitted from the base station 10 to the terminal station 20. The input data is fed via the data controller 11 to the spreading circuit 120. The data controller 11 subjects the input data to a given process corresponding to digital modulation such as PSK modulation or QPSK modulation. The clock signal generator 14 produces a clock signal having a predetermined fixed frequency. The clock signal generator 14 outputs the clock signal to the spreading circuit 120. The spreading circuit 120 includes a generator which produces a pseudo-noise code (a spread code) in response to the clock signal. The produced pseudo-noise code agrees with a pseudo-noise code assigned to the terminal station 20. The spreading circuit 120 includes a multiplier or a mixer which converts the input data into a base-band spread-spectrum information signal in response to the pseudo-noise code. The spreading circuit 120 outputs the base-band spread-spectrum information signal to the RF modulator 121. The RF modulator 121 modulates an RF carrier in accordance with the base-band spread-spectrum information signal, thereby converting the base-band spread-spectrum information signal into an RF spread-spectrum information signal. The RF spread-spectrum information signal is fed to the antenna 16 via the RF power amplifier and the duplexer 15. The RF spread-spectrum information signal is radiated from the antenna 16.

The receiving side of the terminal station 20 operates as follows. An RF spread-spectrum information signal transmitted from the base station 10 is caught by the antenna 26, being fed from the antenna 26 to the RF demodulating circuit 230 via the duplexer 25 and the receiver front end. The RF demodulating circuit 230 subjects the RF spread-spectrum information signal to RF demodulation, and thereby converts the RF spread-spectrum information signal into a base-band spread-spectrum information signal. The RF demodulating circuit 230 outputs the base-band spread-spectrum information signal to the A/D converter 231. The A/D converter 231 changes the base-band spread-spectrum information signal into a corresponding digital version. The A/D converter 231 may use the output signal of the VCO 24 as a sample timing control signal. The A/D converter 231 outputs the digital version of the base-band spread-spectrum information signal to the sync acquisition circuit 232 and the sync tracking circuit 234.

The sync acquisition circuit 232 receives the output signal of the VCO 24, and uses the output signal of the VCO 24 as a clock signal. The sync acquisition circuit 232 has a section for generating a reference code in response to the clock signal. The reference code corresponds to the pseudo-noise code assigned to the terminal station 20. The sync acquisition circuit 232 has a correlator operating on the base-band spread-spectrum information signal and the reference code. The correlator detects a correlation between the base-band spread-spectrum information signal and the reference code as the phase of the reference code is shifted relative to the phase of the base-band spread-spectrum information signal. Alternatively, the correlator may detect a correlation between the base-band spread-spectrum information signal and the reference code at each of different phases of the reference code. The sync acquisition circuit 232 determines the phase of the reference code relative to the phase of the base-band spread-spectrum information signal at which the detected correlation is maximized. The sync acquisition circuit 232 outputs a signal representing a phase error or a timing error between the base-band spread-spectrum information signal and the present reference code (that is, a phase error or a timing error between the base-band spread-spectrum information signal and the clock signal). Alternatively, the output signal of the sync acquisition circuit 232 may represent a best-matching timing relation between the base-band spread-spectrum information signal and the reference code. The output signal of the sync acquisition circuit 232 is fed via the sync tracking circuit 234 to the VCO 24 so that the frequency or the phase of the output signal of the VCO 24 is controlled in response to the output signal of the sync acquisition circuit 232. The control of the VCO 24 is designed to provide best matching in timing between the base-band spread-spectrum information signal and the reference code (the pseudo-noise code), that is, to acquire the synchronization between the base-band spread-spectrum information signal and the reference code (the pseudo-noise code).

After the synchronization between the base-band spread-spectrum information signal and the reference code (the pseudo-noise code) has been acquired by the sync acquisition circuit 232, the sync tracking circuit 234 starts to effectively operate. The sync tracking circuit 234 includes a delay locked loop circuit (a DLL circuit). The DLL circuit is informed of the reference code by the sync acquisition circuit 232. The DLL circuit receives the base-band spread-spectrum information signal from the A/D converter 231. The DLL circuit generates a pair of sub reference signals which are advanced and retarded from the reference signal by one bit (or one symbol) respectively. The DLL circuit detects a first correlation between the base-band spread-spectrum information signal and the advanced sub reference code, and also detects a second correlation between the base-band spread-spectrum information signal and the retarded sub reference signal. The DLL circuit calculates the difference between the absolute value of the first correlation and the absolute value of the second correlation. The DLL circuit generates a control signal depending on the calculated difference, and outputs the control signal to the VCO 24. The frequency or the phase of the output signal of the VCO 24 is controlled in response to the output signal of the DLL circuit to reduce the calculated difference. The control of the VCO 24 is designed to maintain the synchronization between the base-band spread-spectrum information signal and the reference code (the pseudo-noise code).

The sync acquisition circuit 232 has a section for despreading the base-band spread-spectrum information signal into a non-spread information signal in response to the pseudo-noise code (the reference code). The sync acquisition circuit 232 outputs the non-spread information signal to the decoding circuit 233. The decoding circuit 233 subjects the non-spread information signal to a given process corresponding to digital demodulation such as PSK demodulation or QPSK demodulation, and thereby recovers original data from the non-spread information signal. The decoding circuit 233 uses the output signal of the VCO 24 as a demodulation timing control signal. The decoding circuit 233 feeds the recovered original data to the data controller 21, and then the recovered original data is outputted from the data controller 21.

The transmitting side of the terminal station 20 operates as follows. The terminal station 20 receives input data which should be transmitted from the terminal station 20 to the base station 10. The input data is fed via the data controller 21 to the transmitter 22. The data controller 21 subjects the input data to a given process corresponding to digital modulation such as PSK modulation or QPSK modulation. The transmitter 22 receives the output signal of the VCO 24 as a clock signal. The transmitter 22 includes a generator which produces a pseudo-noise code (a spread code) in response to the clock signal. The produced pseudo-noise code agrees with a pseudo-noise code assigned to the terminal station 20. The transmitter 22 includes a multiplier or a mixer which converts the input data into a base-band spread-spectrum information signal in response to the pseudo-noise code. The transmitter 22 includes an RF modulator which converts the base-band spread-spectrum information signal into an RF spread-spectrum information signal. The RF spread-spectrum information signal is fed from the transmitter 22 to the antenna 26 via an RF power amplifier (not shown) and the duplexer 25. The RF spread-spectrum information signal is radiated from the antenna 26.

The receiving side of the base station 10 operates as follows. An RF spread-spectrum information signal transmitted from the terminal station 20 is caught by the antenna 16, being fed from the antenna 16 to the RF demodulating circuit 131 via the duplexer 15 and the receiver front end. The RF demodulating circuit 131 subjects the RF spread-spectrum information signal to RF demodulation, and thereby converts the RF spread-spectrum information signal into a base-band spread-spectrum information signal. The RF demodulating circuit 131 outputs the base-band spread-spectrum information signal to the A/D converter 141. The A/D converter 141 changes the base-band spread-spectrum information signal into a corresponding digital version. The A/D converter 141 may use the output signal of the delay circuit 145 as a sample timing control signal. The A/D converter 141 outputs the digital version of the base-band spread-spectrum information signal to the sync acquisition circuit 142.

The delay circuit 145 receives the clock signal from the clock signal generator 14. The delay circuit 145 is of the variable type, delaying the clock signal by an interval which is controlled in response to an output signal of the delay controller 144. The delay circuit 145 outputs the delay-resultant clock signal.

The sync acquisition circuit 142 receives the output signal of the delay circuit 145, and uses the output signal of the delay circuit 145 as a clock signal. The sync acquisition circuit 142 has a section for generating a reference code in response to the clock signal. The reference code corresponds to the pseudo-noise code assigned to the terminal station 20. The sync acquisition circuit 142 has a correlator operating on the base-band spread-spectrum information signal and the reference code. The correlator detects a correlation between the base-band spread-spectrum information signal and the reference code as the phase of the reference code is shifted bit by bit (symbol by symbol) relative to the phase of the base-band spread-spectrum information signal. Alternatively, the correlator may detect a correlation between the base-band spread-spectrum information signal and the reference code at each of different phases of the reference code. The sync acquisition circuit 142 determines the phase of the reference code relative to the phase of the base-band spread-spectrum information signal at which the detected correlation is maximized. Then, the sync acquisition circuit 142 uses the reference code having the determined phase. These steps of operation of the sync acquisition circuit 142 provide good matching in timing between the base-band spread-spectrum information signal and the reference code (the pseudo-noise code), that is, acquire coarse synchronization between the base-band spread-spectrum information signal and the reference code (the pseudo-noise code). It should be noted that the amount of delay provided by the delay circuit 145 is initially set to a predetermined delay amount d0.

After the coarse synchronization between the base-band spread-spectrum information signal and the reference code (the pseudo-noise code) has been acquired by the sync acquisition circuit 142, the delay controller 144 and the delay circuit 145 cooperate to start a synchronization tracking process which provides fine synchronization between the base-band spread-spectrum information signal and the reference code (the pseudo-noise code). The delay controller 144 is informed of the detected correlation by the sync acquisition circuit 142. The delay controller 144 controls the delay circuit 145 to sequentially change the amount of delay provided by the delay circuit 145. The change in the amount of delay provided by the delay circuit 145 causes a slight variation in the phase of the reference code (the pseudo-noise code) used in the sync acquisition circuit 142. The delay controller 144 monitors the detected correlation as the amount of delay provided by the delay circuit 145 is sequentially changed. The delay controller 144 detects the maximum of the detected correlation during the sequential change of the amount of delay provided by the delay circuit 145. After the maximum correlation has been detected, the delay controller 144 controls the delay circuit 145 so that the amount of delay provided by the delay circuit 145 will be equal to the delay amount corresponding to the maximum correlation. These steps of operation of the delay controller 144 and the delay circuit 145 provide and maintain fine synchronization between the base-band spread-spectrum information signal and the reference code (the pseudo-noise code).

The sync acquisition circuit 142 has a section for despreading the base-band spread-spectrum information signal into a non-spread information signal in response to the pseudo-noise code (the reference code). The sync acquisition circuit 142 outputs the non-spread information signal to the decoding circuit 143. The decoding circuit 143 subjects the non-spread information signal to a given process corresponding to digital demodulation such as PSK demodulation or QPSK demodulation, and thereby recovers original data from the non-spread information signal. The decoding circuit 143 uses the output signal of the delay circuit 145 as a demodulation timing control signal. The decoding circuit 143 feeds the recovered original data to the data controller 11, and then the recovered original data is outputted from the data controller 11.

Figure 2:
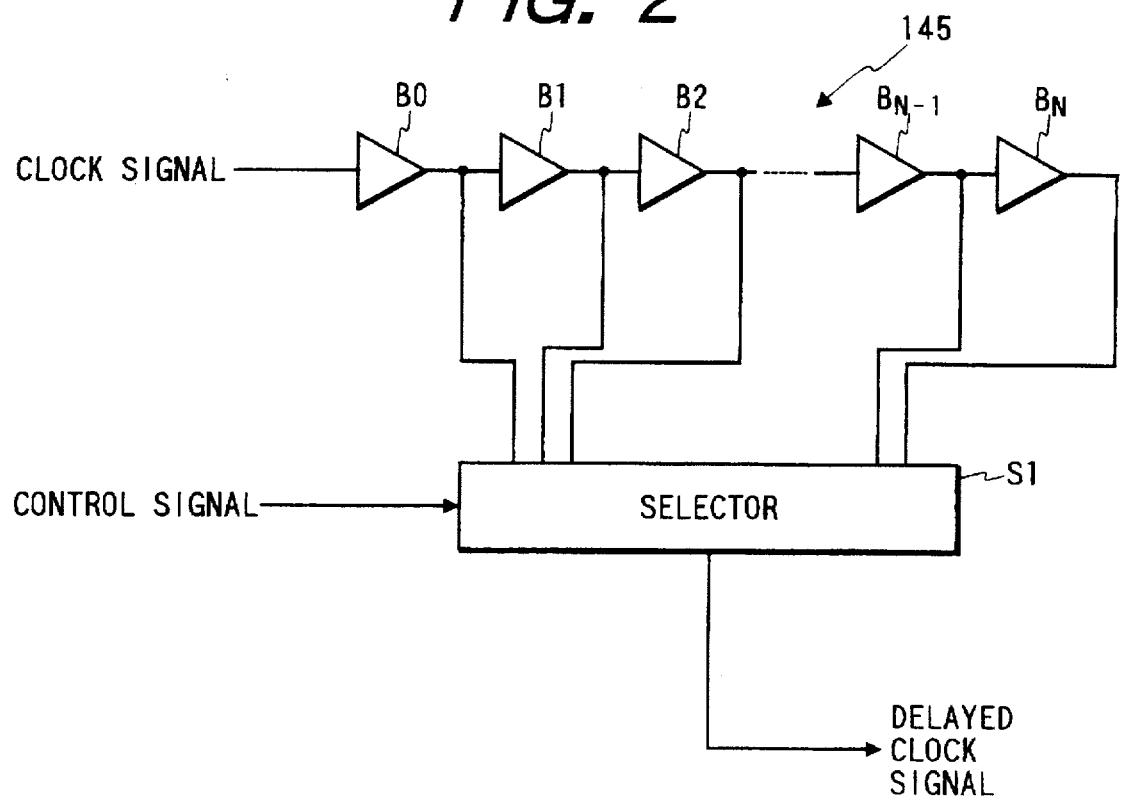
FIG. 2 is a block diagram of a variable delay circuit in the system of FIG. 1.

As shown in FIG. 2, the delay circuit 145 includes a series combination of buffers B0, B1, B2, . . . , BN-1, and BN. Each of the buffers B0, B1, B2, . . . , BN-1, and BN may be a logic gate buffer, an AND gate, or an OR gate. The delay circuit 145 also includes a switch or a selector S1 which is connected to the output terminals of the buffers B0, B1, B2, . . . , BN-1, and BN. The input terminal of the first buffer B1 receives the clock signal from the clock signal generator 14 (see FIG. 1). The clock signal is propagated through the buffers B0, B1, B2, . . . , BN-1, and BN while being successively delayed thereby. The buffers B0, B1, B2, . . . , BN-1, and BN have similar structures and provide equal delay amounts corresponding to several nanoseconds. Accordingly, the output signals of the buffers B0, B1, B2, . . . , BN-1, and BN agree with clock signals which are delayed from the output clock signal of the clock signal generator 14 by different intervals respectively. The selector S1 receives a control signal from the delay controller 144 (see FIG. 1). The selector S1 also receives the output signals of the buffers B0, B1, B2, . . . , BN-1, and BN. The selector S1 selects one of the output signals of the buffers B0, B1, B2, . . . , BN-1, and BN in response to the control signal, and outputs the selected signal as a delay-resultant clock signal. Accordingly, the amount of delay provided by the delay circuit 145 depends on the control signal fed from the delay controller 144.

During the coarse-synchronization acquiring process, the selector S1 initially selects, for example, the output signal of the buffer B0 in response to the control signal fed from the delay controller 144. The delay circuit 145 feeds the output signal of the buffer B0 to the sync acquisition circuit 142 as a clock signal. As previously described, the sync acquisition circuit 142 generates a reference code in response to the clock signal. During the coarse-synchronization acquiring process, the sync acquisition circuit 142 detects the phase of the reference code at which the correlation between the base-band spread-spectrum information signal and the reference code is maximized. Then, the sync acquisition circuit 142 uses the reference code having the phase corresponding to the maximum correlation. The coarse-synchronization acquiring process is followed by the synchronization tracking process for providing the fine synchronization. During the synchronization tracking process, the selector S1 is changed by the control signal fed from the delay controller 144 so that slightly different phases of the reference code are sequentially provided in the sync acquisition circuit 142. As previously described, the sync acquisition circuit 142 informs the delay controller 144 of the correlation between the base-band spread-spectrum information signal and the reference signal at each of the slightly different phases of the reference signal. The delay controller 144 controls the delay circuit 145 in response to the detected correlation so that the amount of delay provided by the delay circuit 145 will be adjusted to maximize the detected correlation. As a result, it is possible to provide and maintain the fine synchronization between the base-band spread-spectrum information signal and the reference code (the pseudo-noise code).

Figure 11:
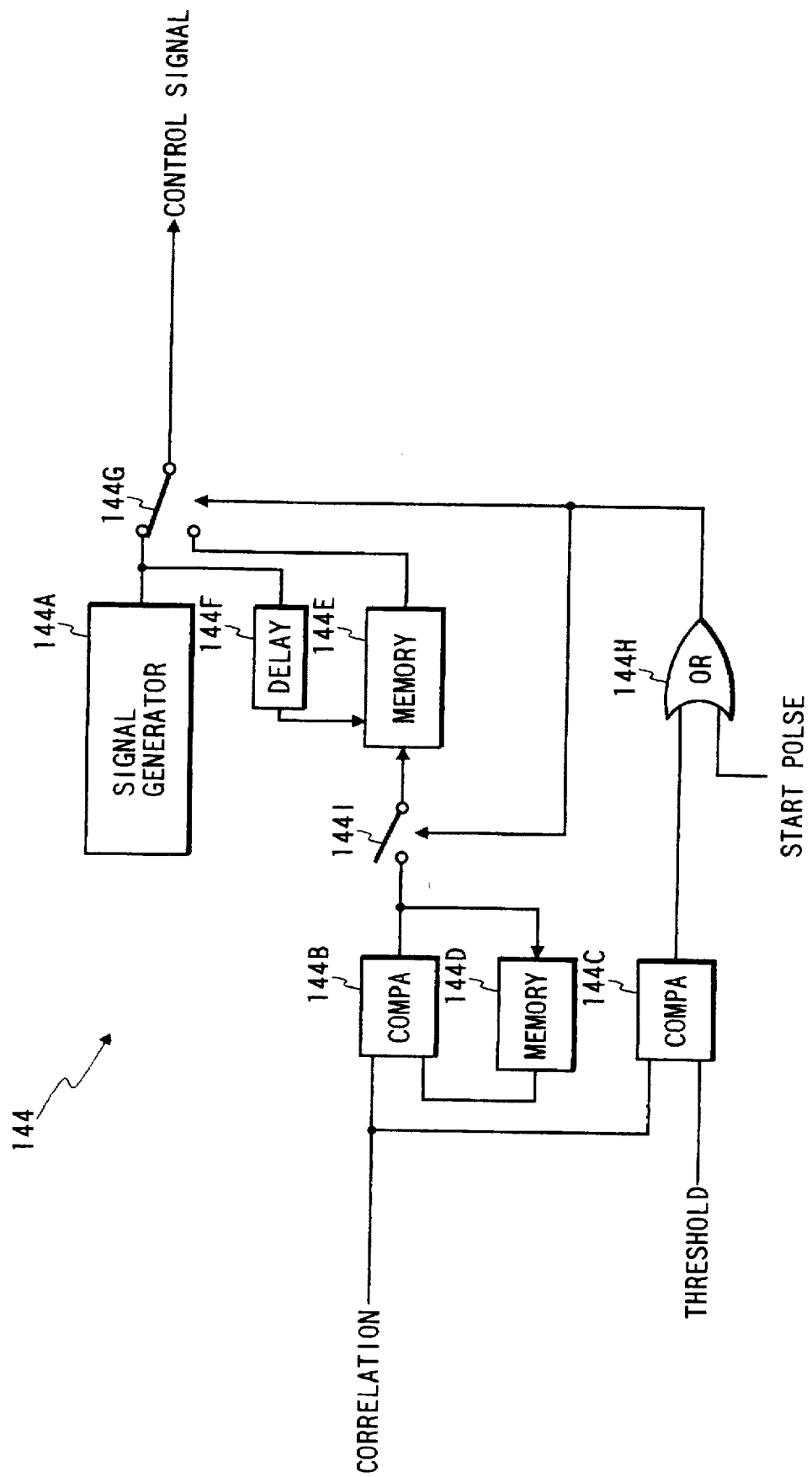
FIG. 11 is a block diagram of a part of a delay controller in the system of FIG. 1.

As shown in FIG. 11, the delay controller 144 includes a signal generator 144A, comparators 144B and 144C, memories 144D and 144E, a delay element 144F, a switch 144G, an OR gate 144H, and a switch 144I. The sync acquisition circuit 142 (see FIG. 1) informs the delay controller 144 of the detected correlation between the base-band spread-spectrum information signal and the reference signal at each of slightly different phases of the reference signal. First input terminals of the comparators 144B and 144C receive information of the detected correlation. A second input terminal of the comparator 144B is connected to the output terminal of the memory 144D. A second input terminal of the comparator 144C is subjected to a fixed signal representing a given threshold value. The output terminal of the comparator 144B is connected to a control terminal of the memory 144E via the switch 144I. The output terminal of the comparator 144B is also connected to the input terminal of the memory 144D. The input terminal of the memory 144E is connected to the signal generator 144A via the delay element 144F. The output terminal of the memory 144E is connected to the switch 144G. The signal generator 144A is connected to the switch 144G. The output terminal of the comparator 144C leads to a first input terminal of the OR gate 144H. A second input terminal of the OR gate 144H can receive a start pulse signal from a suitable device (not shown). The output terminal of the OR gate 144H is connected to a control terminal of the switch 144G and also a control terminal of the switch 144I. The switch 144G is connected to the delay circuit 145 (see FIG. 1).

At an initial stage of operation, the switch 144G selects the output signal of the memory 144E and transmits the output signal of the memory 144E to the delay circuit 145 (see FIG. 1) as the control signal. At this time, the output signal of the memory 144E is in an initial state corresponding to the predetermined delay amount d0, and the switch 144I is in an open state. Then, the coarse-synchronization acquiring process is started. After the coarse synchronization between the base-band spread-spectrum information signal and the reference code (the pseudo-noise code) has been acquired, a start pulse signal is fed to the switch 144G via the OR gate 144H. The switch 144G changes in response to the start pulse signal, and hence selects the output signal of the signal generator 144A and transmits the output signal of the signal generator 144A to the delay circuit 145 (see FIG. 1) as the control signal. The output signal of the signal generator 144A periodically changes among states corresponding to different delay amounts d0, d1, . . . , and dm respectively. The output signal of the signal generator 144A is applied to the memory 144E via the delay element 144F. The start pulse signal is also fed to the switch 144I via the OR gate 144H. The switch 144I changes to a closed state in response to the start pulse signal.

The comparator 144B is sequentially informed of detected correlations which correspond to the different delay amounts respectively. The comparator 144B compares a detected correlation with a maximum correlation fed from the memory 144D. When the detected correlation is greater than the maximum correlation, the comparator 144B replaces the maximum correlation by the detected correlation in the memory 144D to update the maximum correlation. At the same time, the comparator 144B replaces the control signal in the memory 144E by the output signal of the delay element 144F to update the control signal in the memory 144E. The new control signal in the memory 144E corresponds to the new maximum correlation in the memory 144D. When the detected correlation is not greater than the maximum correlation, the comparator 144B does not update the maximum correlation in the memory 144D and the control signal in the memory 144E. After one cycle of change of the output signal of the signal generator 144A has been completed, the switch 144G changes so that the output signal of the memory 144E is transmitted to the delay circuit 145 (see FIG. 1) as the control signal. At the same time, the switch 144I returns to the open state.

The comparator 144C compares the detected correlation with the threshold value. When the detected correlation drops below the threshold value, the comparator 144C feeds a start pulse signal to the switches 144G and 144I via the OR gate 144H. In this case, the previously-indicated steps of operation are started by the start pulse signal.

It is preferable to initialize the control signal in the memory 144E when a power supply switch (not shown) is moved to an on position. It is preferable that the control signal in the memory 144E remains unchanged regardless of the occurrence of suspension of signal reception as long as the power supply switch (not shown) continues to be in the on position.

Second Embodiment

Figure 3:
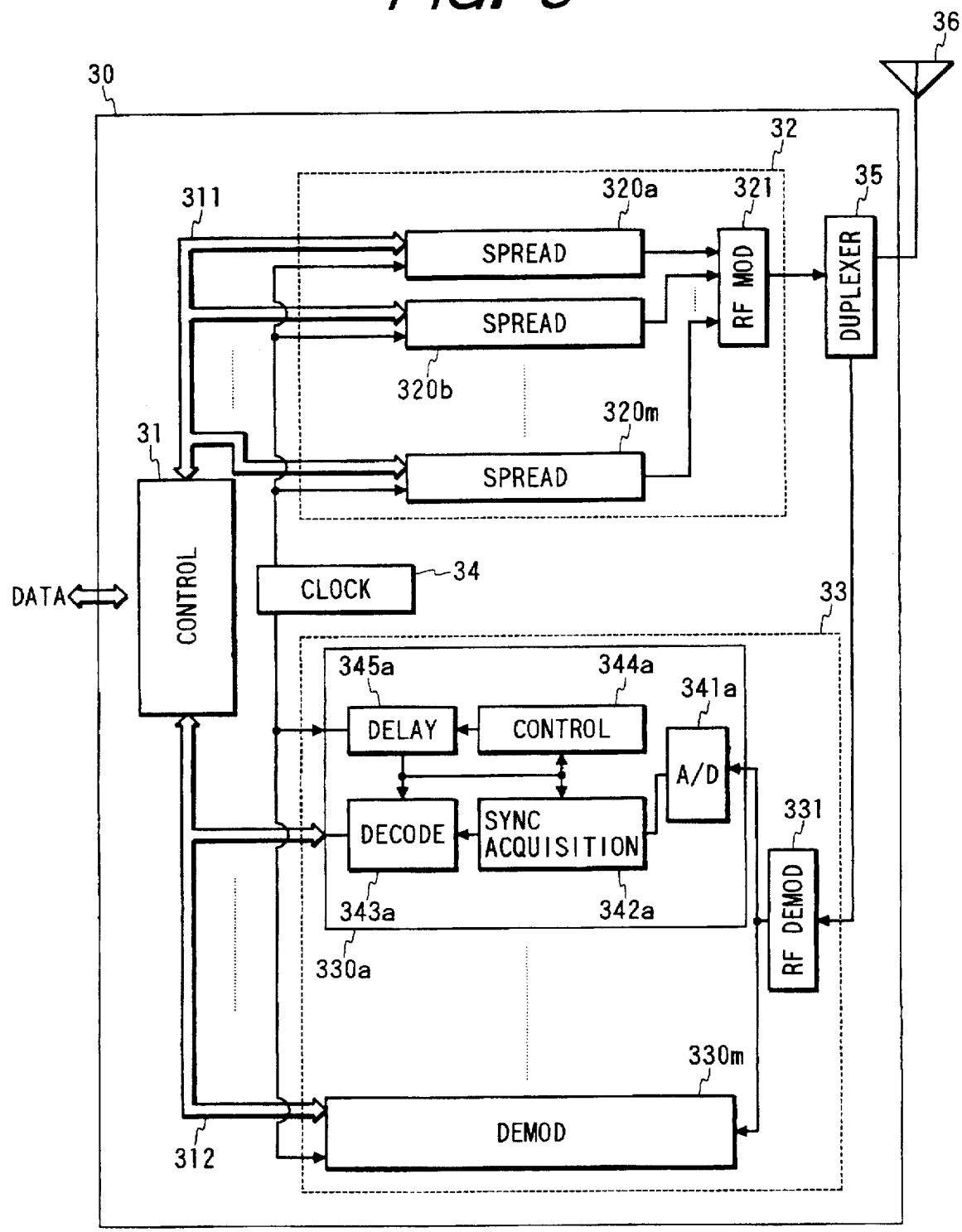
FIG. 3 is a block diagram of a base station in a direct-sequence spread-spectrum communication system according to a second embodiment of this invention.

A second embodiment of this invention is similar to the first embodiment except for design changes indicated hereinafter. FIG. 3 shows a base station 30 in a direct-sequence spread-spectrum communication system according to the second embodiment. The base station 30 is able to communicate with a plurality of terminal stations similar to the terminal station 20 of FIG. 1.

With reference to FIG. 3, the base station 30 includes a data controller 31, a transmitter 32, a receiver 33, a clock signal generator 34, a duplexer 35, and an antenna 36.

The transmitter 32 has a plurality of spreading circuits 320a, 320b, . . . , and 320m corresponding to the terminal stations respectively. The transmitter 32 also has an RF modulator 321. The input sides of the spreading circuits 320a, 320b, . . . , and 320m are connected to the data controller 31 via a bus line 311. The output sides of the spreading circuits 320a, 320b, . . . , and 320m are connected to the input side of the RF modulator 321. The output side of the RF modulator 321 is connected to the antenna 36 via an RF power amplifier (not shown) and the duplexer 35. The spreading circuits 320a, 320b, . . . , and 320m are connected to the clock signal generator 34.

The receiver 33 has a plurality of detecting circuits 330a, 330b, . . . , and 330m corresponding to the terminal stations respectively. The receiver 33 also has an RF demodulating circuit (an RF demodulator) 331. The input side of the RF demodulating circuit 331 is connected to the antenna 36 via a receiver front end (not shown) and the duplexer 35. The input sides of the detecting circuits 330a, 330b, . . . , and 330m are connected to the output side of the RF demodulating circuit 331. The output sides of the detecting circuits 330a, 330b, . . . , and 330m are connected to the data controller 31 via a bus line 312. The detecting circuits 330a, 330b, . . . , and 330m are also connected to the clock signal generator 34.

The detecting circuits 330a, 330b, . . . , and 330m are similar to each other. Only the detecting circuit 330a will now be described in detail. The detecting circuit 330a has an A/D converter 341a, a sync acquisition circuit 342a, a decoding circuit 343a, a delay controller 344a, and a delay circuit 345a. The input side of the A/D converter 341a is connected to the output side of the RF demodulating circuit 331. The output side of the A/D converter 341a is connected to the sync acquisition circuit 342a. The sync acquisition circuit 342a is connected to the output side of the delay circuit 345a and the input side of the decoding circuit 343a. The output side of the decoding circuit 343a is connected to the data controller 31. The decoding circuit 343a is also connected to the output side of the delay circuit 345a. The delay controller 344a is connected to the sync acquisition circuit 342a and the delay circuit 345a.

The transmitting side of the base station 30 operates as follows. The base station 30 receives input data pieces which should be transmitted from the base station 30 to the terminal stations respectively. The input data pieces are fed via the data controller 31 to the spreading circuits 320a, 320b, . . . , and 320m respectively. The data controller 31 subjects the input data pieces to a given process corresponding to digital modulation such as PSK modulation or QPSK modulation. The clock signal generator 34 produces a clock signal having a predetermined fixed frequency. The clock signal generator 34 outputs the clock signal to the spreading circuits 320a, 320b, . . . , and 320m. Each of the spreading circuits 320a, 320b, . . . , and 320m includes a generator which produces a pseudo-noise code (a spread code) in response to the clock signal. The produced pseudo-noise code agrees with a pseudo-noise code assigned to the corresponding terminal station. Each of the spreading circuits 320a, 320b, . . . , and 320m includes a multiplier or a mixer which converts the input data piece into a base-band spread-spectrum information signal in response to the pseudo-noise code. The spreading circuits 320a, 320b, . . . , and 320m output the base-band spread-spectrum information signals to the RF modulator 321. The RF modulator 321 combines the base-band spread-spectrum information signals and modulates an RF carrier in accordance with the combination of the base-band spread-spectrum information signals, thereby converting the combination of the base-band spread-spectrum information signals into an RF spread-spectrum information signal. The RF spread-spectrum information signal is fed from the RF modulator 321 to the antenna 36 via the RF power amplifier and the duplexer 35. The RF spread-spectrum information signal is irradiated from the antenna 36.

The receiving side of the base station 30 operates as follows. RF spread-spectrum information signals transmitted from the terminal stations are caught by the antenna 36, being fed from the antenna 36 to the RF demodulating circuit 331 via the duplexer 35 and the receiver front end. The RF demodulating circuit 331 subjects the RF spread-spectrum information signals to RF demodulation, and thereby converts the RF spread-spectrum information signals into a composite base-band spread-spectrum information signal. The RF demodulating circuit 331 outputs the composite base-band spread-spectrum information signal to the detecting circuits 330a, 330b, . . . , and 330m.

The detecting circuits 330a, 330b, . . . , and 330m operate similarly to each other. Only operation of the detecting circuit 330a will now be described in detail. In the detecting circuit 330a, the composite base-band spread-spectrum information signal is applied to the A/D converter 341a. The A/D converter 341a changes the composite base-band spread-spectrum information signal into a corresponding digital version. The A/D converter 341a may use the output signal of the delay circuit 345a as a sample timing control signal. The A/D converter 341a outputs the digital version of the composite base-band spread-spectrum information signal to the sync acquisition circuit 342a.

The delay circuit 345a receives the clock signal from the clock signal generator 34. The delay circuit 345a is of the variable type, delaying the clock signal by an interval which is controlled in response to an output signal of the delay controller 344a. The delay circuit 345a outputs the delay-resultant clock signal.

The sync acquisition circuit 342a receives the output signal of the delay circuit 345a, and uses the output signal of the delay circuit 345a as a clock signal. The sync acquisition circuit 342a has a section for generating a reference code in response to the clock signal. The reference code corresponds to the pseudo-noise code assigned to the corresponding terminal station. The sync acquisition circuit 342a has a correlator operating on the composite base-band spread-spectrum information signal and the reference code. The correlator detects a correlation between the composite base-band spread-spectrum information signal and the reference code as the phase of the reference code is shifted bit by bit (symbol by symbol) relative to the phase of the composite base-band spread-spectrum information signal. Alternatively, the correlator may detect a correlation between the composite base-band spread-spectrum information signal and the reference code at each of different phases of the reference code. The sync acquisition circuit 342a determines the phase of the reference code relative to the phase of the composite base-band spread-spectrum information signal at which the detected correlation is maximized.

Then, the sync acquisition circuit 342a uses the reference code having the determined phase. These steps of operation of the sync acquisition circuit 342a provide good matching in timing between the composite base-band spread-spectrum information signal and the reference code (the pseudo-noise code), that is, acquire coarse synchronization between the composite base-band spread-spectrum information signal and the reference code (the pseudo-noise code). It should be noted that the amount of delay provided by the delay circuit 345a is initially set to a predetermined delay amount d0.

After the coarse synchronization between the composite base-band spread-spectrum information signal and the reference code (the pseudo-noise code) has been acquired by the sync acquisition circuit 342a, the delay controller 344a and the delay circuit 345a cooperate to start a synchronization tracking process which provides fine synchronization between the composite base-band spread-spectrum information signal and the reference code (the pseudo-noise code). The delay controller 344a is informed of the detected correlation by the sync acquisition circuit 342a. The delay controller 344a controls the delay circuit 345a to sequentially change the amount of delay provided by the delay circuit 345a. The change in the amount of delay provided by the delay circuit 345a causes a slight variation in the phase of the reference code (the pseudo-noise code) used in the sync acquisition circuit 342a. The delay controller 344a monitors the detected correlation as the amount of delay provided by the delay circuit 345a is sequentially changed. The delay controller 344a detects the maximum of the detected correlation during the sequential change of the amount of delay provided by the delay circuit 345a. After the maximum correlation has been detected, the delay controller 344a controls the delay circuit 345a so that the amount of delay provided by the delay circuit 345a will be equal to the delay amount corresponding to the maximum correlation. These steps of operation of the delay controller 344a and the delay circuit 345a provide and maintain fine synchronization between the composite base-band spread-spectrum information signal and the reference code (the pseudo-noise code).

The sync acquisition circuit 342a has a section for despreading the composite base-band spread-spectrum information signal into a non-spread information signal in response to the pseudo-noise code (the reference code). The sync acquisition circuit 342a outputs the non-spread information signal to the decoding circuit 343a. The decoding circuit 343a subjects the non-spread information signal to a given process corresponding to digital demodulation such as PSK demodulation or QPSK demodulation, and thereby recovers an original data piece from the non-spread information signal. The decoding circuit 343a uses the output signal of the delay circuit 345a as a demodulation timing control signal. The decoding circuit 343a feeds the recovered original data piece to the data controller 31, and then the recovered original data piece is outputted from the data controller 31.

The delay circuits in the detecting circuits 330a, 330b, . . . , and 330m are able to delay the clock signal by intervals independent of each other.

Third Embodiment

A third embodiment of this invention is similar to the first embodiment except that a delay circuit 145A replaces the delay circuit 145 in FIGS. 1 and 2.

Figure 4:
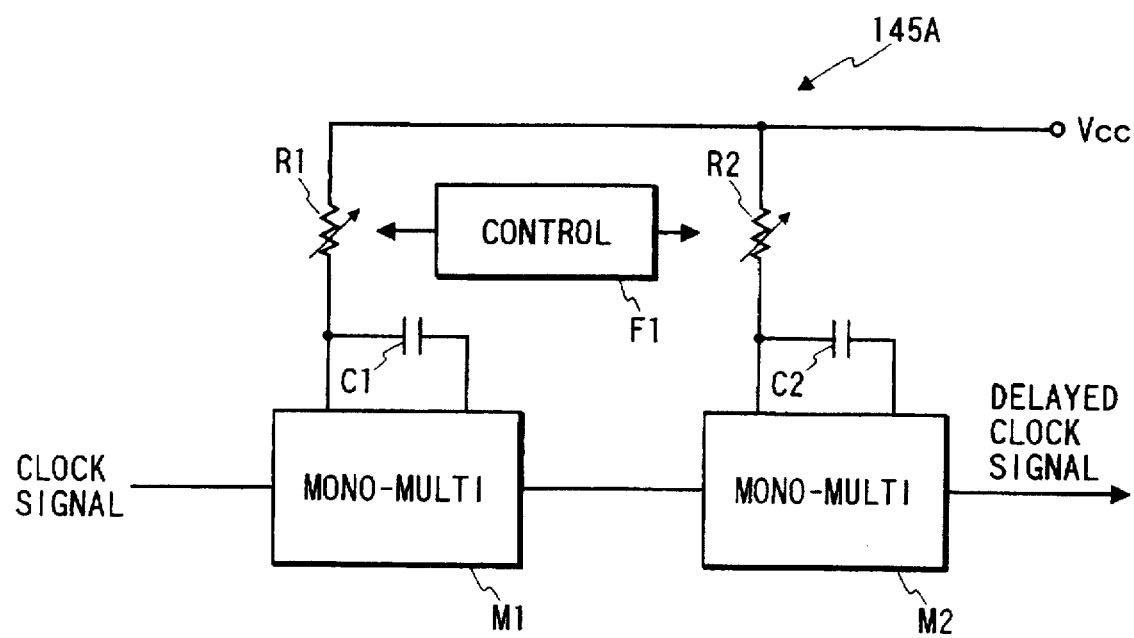
FIG. 4 is a diagram of a variable delay circuit in a direct-sequence spread-spectrum communication system according to a third embodiment of this invention.

As shown in FIG. 4, the delay circuit 145A includes a series combination of monostable multivibrators M1 and M2. The input side of the monostable multivibrator M1 receives a clock signal from a clock signal generator 14 (see FIG. 1). The clock signal is propagated through the monostable multivibrators M1 and M2 while being successively delayed thereby. The output signal of the monostable multivibrator M2 constitutes a delay-resultant clock signal outputted from the delay circuit 145A.

A fixed capacitor C1 and a variable resistor R1 are connected to the monostable multivibrator M1. The amount of delay provided by the monostable multivibrator M1 depends on a time constant thereof which is determined by the capacitance of the fixed capacitor C1 and the resistance of the variable resistor R1. A fixed capacitor C2 and a variable resistor R2 are connected to the monostable multivibrator M2. The amount of delay provided by the monostable multivibrator M2 depends on a time constant thereof which is determined by the capacitance of the fixed capacitor C2 and the resistance of the variable resistor R2. A resistor controller F1 connected to the variable resistors R1 and R2 adjusts the resistances of the variable resistors R1 and R2 in response to an output signal of a delay controller 144 (see FIG. 1). Accordingly, the amount of delay provided by the delay circuit 145A depends on the output signal of the delay controller 144 (see FIG. 1).

Fourth Embodiment

A fourth embodiment of this invention is similar to the first embodiment except that a delay circuit 145B replaces the delay circuit 145 in FIGS. 1 and 2.

Figure 5:
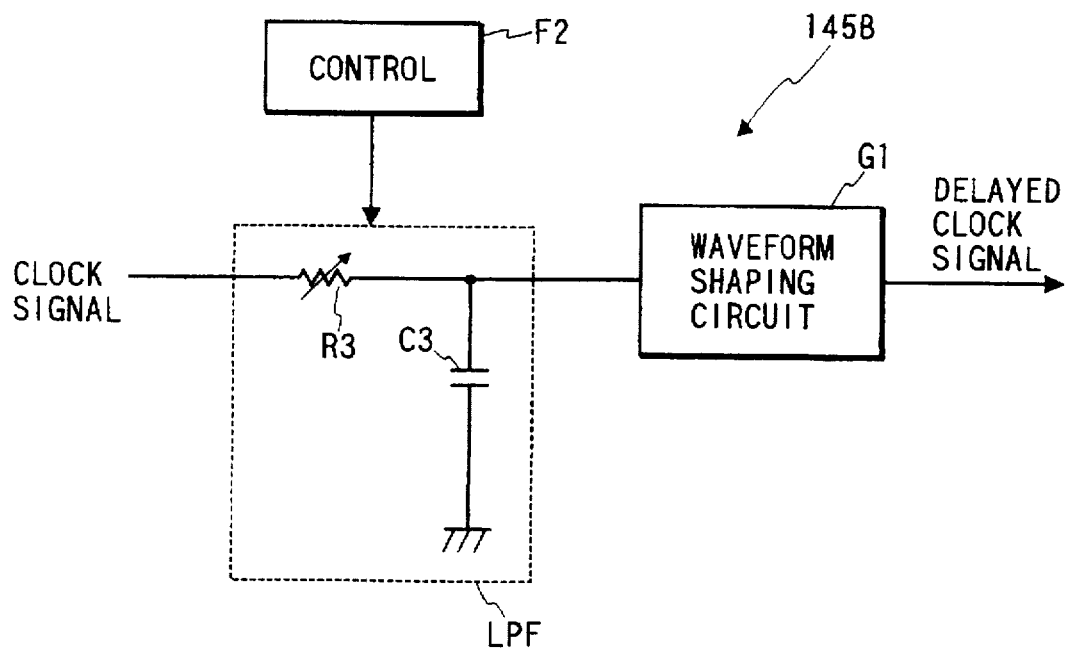
FIG. 5 is a diagram of a variable delay circuit in a direct-sequence spread-spectrum communication system according to a fourth embodiment of this invention.

As shown in FIG. 5, the delay circuit 145B includes a series combination of a low pass filter (an integrating circuit) LPF and a waveform shaping circuit G1. The input side of the low pass filter LPF receives a clock signal from a clock signal generator 14 (see FIG. 1). The clock signal is propagated through the low pass filter LPF and the waveform shaping circuit G1 while being successively delayed thereby. The output signal of the waveform shaping circuit G1 constitutes a delay-resultant clock signal outputted from the delay circuit 145B.

The low pass filter LPF includes a combination of a fixed capacitor C3 and a variable resistor R3. The amount of delay provided by the low pass filter LPF depends on a time constant thereof which is determined by the capacitance of the fixed capacitor C3 and the resistance of the variable resistor R3. A resistor controller F2 connected to the variable resistor R3 adjusts the resistance of the variable resistor R3 in response to an output signal of a delay controller 144 (see FIG. 1). Accordingly, the amount of delay provided by the delay circuit 145B depends on the output signal of the delay controller 144 (see FIG. 1).

Fifth Embodiment

Figure 6:
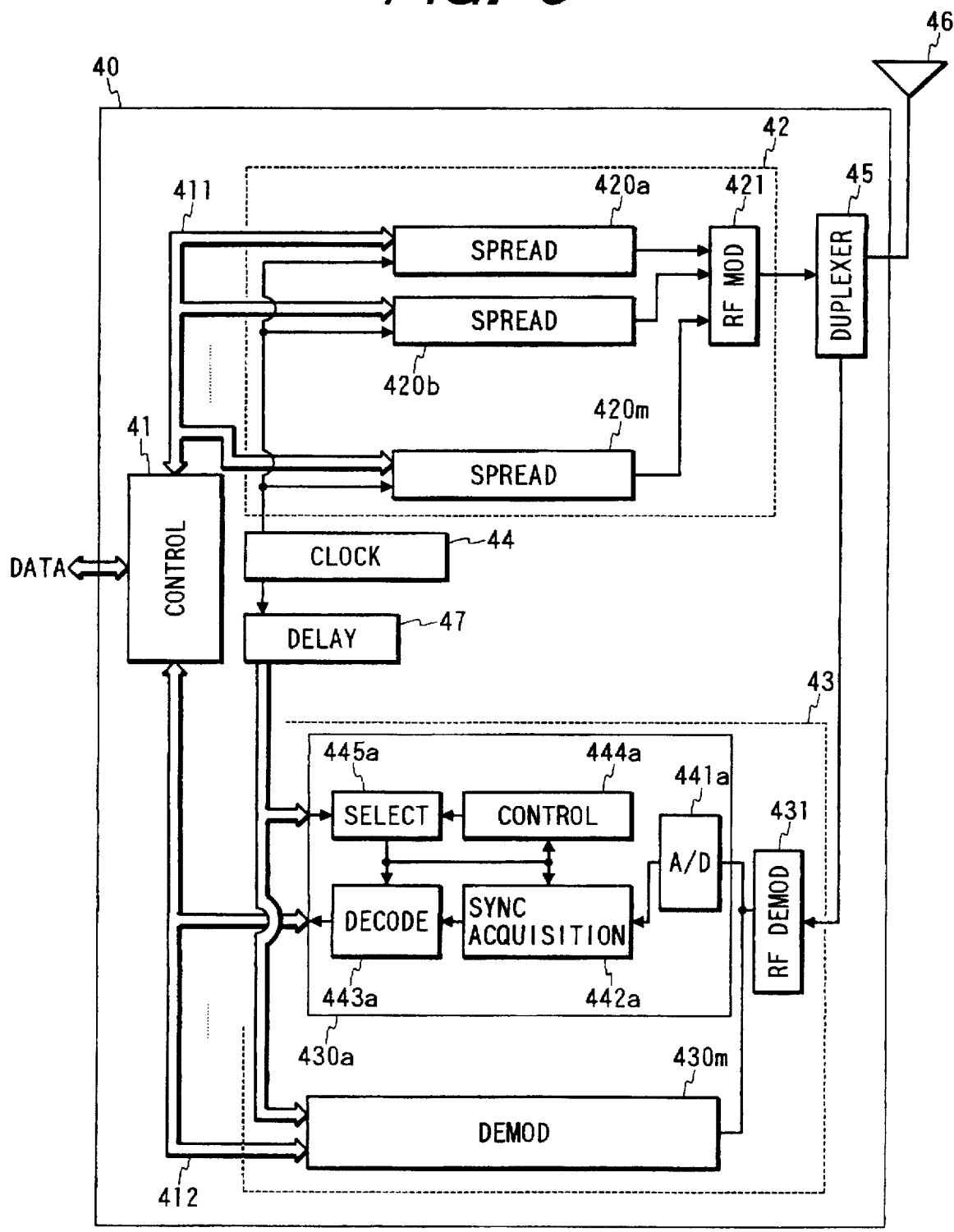
FIG. 6 is a block diagram of a base station in a direct-sequence spread-spectrum communication system according to a fifth embodiment of this invention.

A fifth embodiment of this invention is similar to the first embodiment except for design changes indicated hereinafter. FIG. 6 shows a base station 40 in a direct-sequence spread-spectrum communication system according to the fifth embodiment. The base station 40 is able to communicate with a plurality of terminal stations similar to the terminal station 20 of FIG. 1.

With reference to FIG. 6, the base station 40 includes a data controller 41, a transmitter 42, a receiver 43, a clock signal generator 44, a duplexer 45, an antenna 46, and a delay circuit 47.

The transmitter 42 has a plurality of spreading circuits 420a, 420b, . . . , and 420m corresponding to the terminal stations respectively. The transmitter 42 also has an RF modulator 421. The input sides of the spreading circuits 420a, 420b, . . . , and 420m are connected to the data controller 41 via a bus line 411. The output sides of the spreading circuits 420a, 420b, . . . , and 420m are connected to the input side of the RF modulator 421. The output side of the RF modulator 421 is connected to the antenna 46 via an RF power amplifier (not shown) and the duplexer 45. The spreading circuits 420a, 420b, . . . , and 420m are connected to the clock signal generator 44.

The receiver 43 has a plurality of detecting circuits 430a, 430b, . . . , and 430m corresponding to the terminal stations respectively. The receiver 43 also has an RF demodulating circuit (an RF demodulator) 431. The input side of the RF demodulating circuit 431 is connected to the antenna 46 via a receiver front end (not shown) and the duplexer 45. The input sides of the detecting circuits 430a, 430b, . . . , and 430m are connected to the output side of the RF demodulating circuit 431. The output sides of the detecting circuits 430a, 430b, . . . , and 430m are connected to the data controller 41 via a bus line 412. The detecting circuits 430a, 430b, . . . , and 430m are also connected to the output side of the delay circuit 47.

The detecting circuits 430a, 430b, . . . , and 430m are similar to each other. Only the detecting circuit 430a will now be described in detail. The detecting circuit 430a has an A/D converter 441a, a sync acquisition circuit 442a, a decoding circuit 443a, a delay controller 444a, and a switch or a selector 445a. The input side of the A/D converter 441a is connected to the output side of the RF demodulating circuit 431. The output side of the A/D converter 441a is connected to the sync acquisition circuit 442a. The sync acquisition circuit 442a is connected to the output side of the selector 445a and the input side of the decoding circuit 443a. The output side of the decoding circuit 443a is connected to the data controller 41. The decoding circuit 443a is also connected to the output side of the selector 445a. The delay controller 444a is connected to the sync acquisition circuit 442a and the selector 445a.

The transmitting side of the base station 40 operates as follows. The base station 40 receives input data pieces which should be transmitted from the base station 40 to the terminal stations respectively. The input data pieces are fed via the data controller 41 to the spreading circuits 420a, 420b, . . . , and 420m respectively. The data controller 41 subjects the input data pieces to a given process corresponding to digital modulation such as PSK modulation or QPSK modulation. The clock signal generator 44 produces a clock signal having a predetermined fixed frequency. The clock signal generator 44 outputs the clock signal to the spreading circuits 420a, 420b, . . . , and 420m. Each of the spreading circuits 420a, 420b, . . . , and 420m includes a generator which produces a pseudo-noise code (a spread code) in response to the clock signal. The produced pseudo-noise code agrees with a pseudo-noise code assigned to the corresponding terminal station. Each of the spreading circuits 420a, 420b, . . . , and 420m includes a multiplier or a mixer which converts the input data piece into a base-band spread-spectrum information signal in response to the pseudo-noise code. The spreading circuits 420a, 420b, . . . , and 420m output the base-band spread-spectrum information signals to the RF modulator 421. The RF modulator 421 combines the base-band spread-spectrum information signals and modulates an RF carrier in accordance with the combination of the base-band spread-spectrum information signals, thereby converting the combination of the base-band spread-spectrum information signals into an RF spread-spectrum information signal. The RF spread-spectrum information signal is fed from the RF modulator 421 to the antenna 46 via the RF power amplifier and the duplexer 45. The RF spread-spectrum information signal is radiated from the antenna 46.

Figure 7:
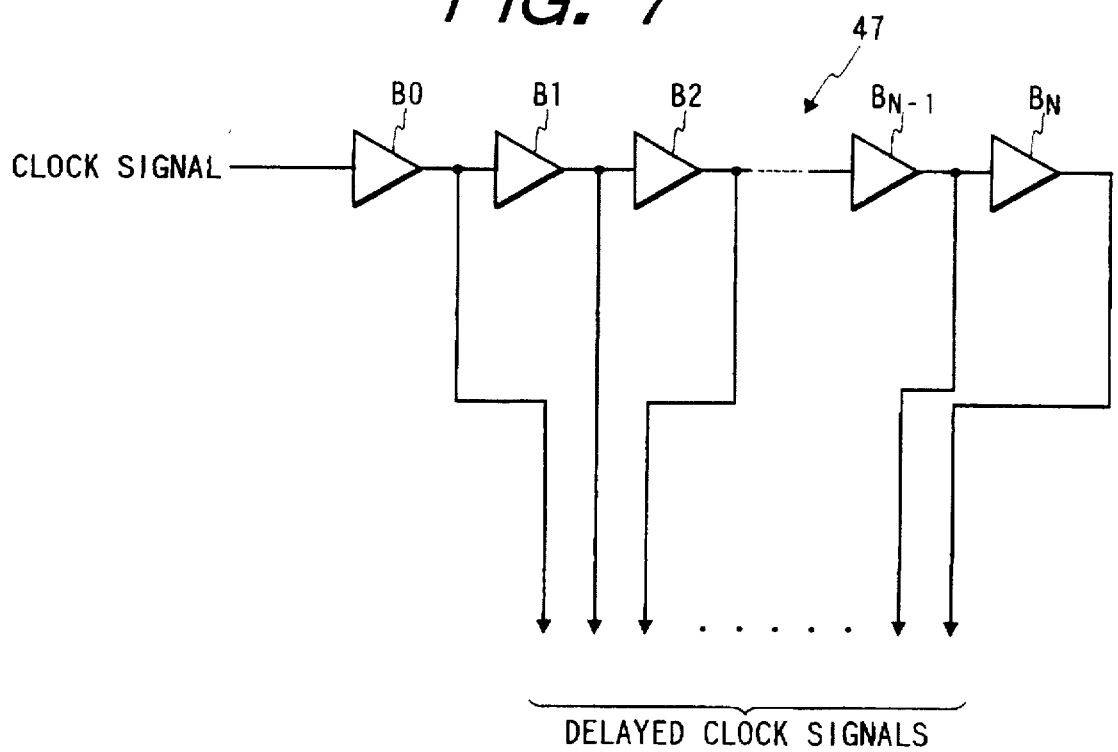
FIG. 7 is a block diagram of a delay circuit in the base station of FIG. 6.

The input side of the delay circuit 47 is connected to the clock signal generator 44. As shown in FIG. 7, the delay circuit 47 includes a series combination of buffers B0, B1, B2, ..., BN-1, and BN. Each of the buffers B0, B1, B2, ..., BN-1, and BN may be a logic gate buffer, an AND gate, or an OR gate. The input terminal of the first buffer B1 receives the clock signal from the clock signal generator 44. The clock signal is propagated through the buffers B0, B1, B2, ..., BN-1, and BN while being successively delayed thereby. The buffers B0, B1, B2, ..., BN-1, and BN have similar structures and provide equal delay amounts corresponding to several nanoseconds. Accordingly, the output signals of the buffers B0, B1, B2, ..., BN-1, and BN agree with clock signals which are delayed from the output clock signal of the clock signal generator 44 by different intervals respectively. The output signals of the buffers B0, B1, B2, ..., BN-1, and BN constitute different delay-resultant clock signals respectively. The delay circuit 47 outputs the different delay-resultant clock signals to the detecting circuits 430a, 430b, ..., and 430m.

The receiving side of the base station 40 operates as follows. RF spread-spectrum information signals transmitted from the terminal stations are caught by the antenna 46, being fed from the antenna 46 to the RF demodulating circuit 431 via the duplexer 45 and the receiver front end. The RF demodulating circuit 431 subjects the RF spread-spectrum information signals to RF demodulation, and thereby converts the RF spread-spectrum information signals into a composite base-band spread-spectrum information signal. The RF demodulating circuit 431 outputs the composite base-band spread-spectrum information signal to the detecting circuits 430a, 430b, ..., and 430m.

The detecting circuits 430a, 430b, ..., and 430m operate similarly to each other. Only operation of the detecting circuit 430a will now be described in detail. In the detecting circuit 430a, the composite base-band spread-spectrum information signal is applied to the A/D converter 441a. The A/D converter 441a changes the composite base-band spread-spectrum information signal into a corresponding digital version. The A/D converter 441a may use the output signal of the selector 445a as a sample timing control signal. The A/D converter 441a outputs the digital version of the composite base-band spread-spectrum information signal to the sync acquisition circuit 442a.

The selector 445a receives a control signal from the delay controller 444a. The selector 445a also receives the delay-resultant clock signals from the delay circuit 47. The selector S1 selects one of the delay-resultant clock signals in response to the control signal, and outputs the selected signal as a final delay-resultant clock signal. Accordingly, the amount of delay provided by the combination of the delay circuit 47 and the selector 445a depends on the control signal fed from the delay controller 444a.

The sync acquisition circuit 442a receives the output signal of the selector 445a, and uses the output signal of the selector 445a as a clock signal. The sync acquisition circuit 442a has a section for generating a reference code in response to the clock signal. The reference code corresponds to the pseudo-noise code assigned to the corresponding terminal station. The sync acquisition circuit 442a has a correlator operating on the composite base-band spread-spectrum information signal and the reference code. The correlator detects a correlation between the composite base-band spread-spectrum information signal and the reference code as the phase of the reference code is shifted bit by bit (symbol by symbol) relative to the phase of the composite base-band spread-spectrum information signal. Alternatively, the correlator may detect a correlation between the composite base-band spread-spectrum information signal and the reference code at each of different phases of the reference code. The sync acquisition circuit 442a determines the phase of the reference code relative to the phase of the composite base-band spread-spectrum information signal at which the detected correlation is maximized. Then, the sync acquisition circuit 442a uses the reference code having the determined phase. These steps of operation of the sync acquisition circuit 442a provide good matching in timing between the composite base-band spread-spectrum information signal and the reference code (the pseudo-noise code), that is, acquire coarse synchronization between the composite base-band spread-spectrum information signal and the reference code (the pseudo-noise code). It should be noted that the amount of delay provided by the combination of the delay circuit 47 and the selector 445a is initially set to a predetermined delay amount d0.

After the coarse synchronization between the composite base-band spread-spectrum information signal and the reference code (the pseudo-noise code) has been acquired by the sync acquisition circuit 442a, the delay controller 444a and the selector 445a cooperate to start a synchronization tracking process which provides fine synchronization between the composite base-band spread-spectrum information signal and the reference code (the pseudo-noise code). The delay controller 444a is informed of the detected correlation by the sync acquisition circuit 442a. The delay controller 444a controls the selector 445a to sequentially change the amount of delay provided by the combination of the delay circuit 47 and the selector 445a. The change in the amount of delay provided by the combination of the delay circuit 47 and the selector 445a causes a slight variation in the phase of the reference code (the pseudo-noise code) used in the sync acquisition circuit 442a. The delay controller 444a monitors the detected correlation as the amount of delay provided by the combination of the delay circuit 47 and the selector 445a is sequentially changed. The delay controller 444a detects the maximum of the detected correlation during the sequential change of the amount of delay provided by the combination of the delay circuit 47 and the selector 445a. After the maximum correlation has been detected, the delay controller 444a controls the selector 445a so that the amount of delay provided by the combination of the delay circuit 47 and the selector 445a will be equal to the delay amount corresponding to the maximum correlation. These steps of operation of the delay controller 444a and the selector 445a provide and maintain fine synchronization between the composite base-band spread-spectrum information signal and the reference code (the pseudo-noise code).

The sync acquisition circuit 442a has a section for despreading the composite base-band spread-spectrum information signal into a non-spread information signal in response to the pseudo-noise code (the reference code). The sync acquisition circuit 442a outputs the non-spread information signal to the decoding circuit 443a. The decoding circuit 443a subjects the non-spread information signal to a given process corresponding to digital demodulation such as PSK demodulation or QPSK demodulation, and thereby recovers an original data piece from the non-spread information signal. The decoding circuit 443a uses the output signal of the selector 445a as a demodulation timing control signal. The decoding circuit 443a feeds the recovered original data piece to the data controller 41, and then the recovered original data piece is outputted from the data controller 41.

The final delay-resultant clock signals outputted from the selectors in the detecting circuits 430a, 430b, . . . , and 430m can be controlled independent of each other.

Sixth Embodiment

Figure 8:
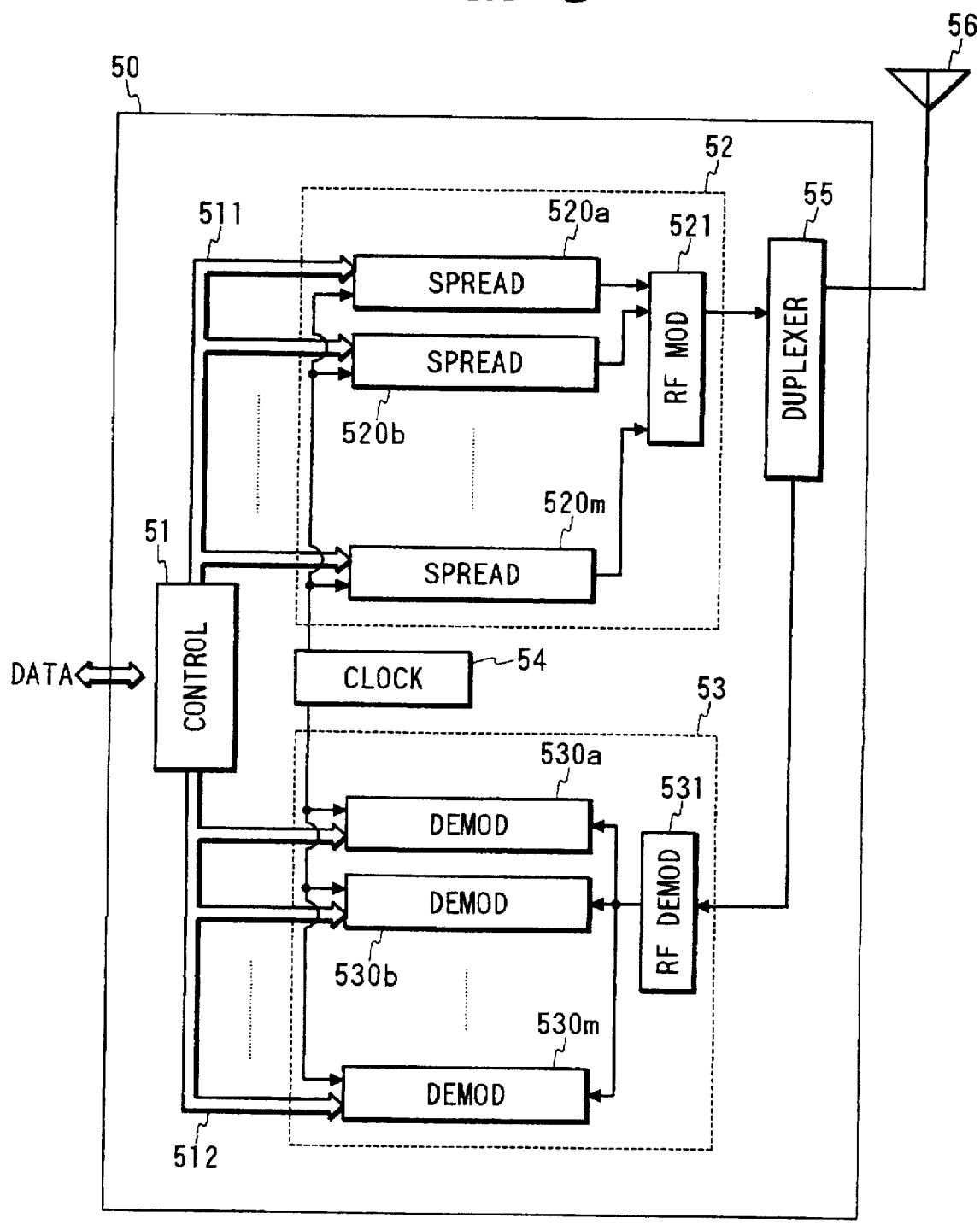
FIG. 8 is a block diagram of a base station in a direct-sequence spread-spectrum communication system according to a sixth embodiment of this invention.

A sixth embodiment of this invention is similar to the first embodiment except for design changes indicated hereinafter. FIG. 8 shows a base station 50 in a direct-sequence spread-spectrum communication system according to the sixth embodiment. The base station 50 is able to communicate with a plurality of terminal stations similar to the terminal station 20 of FIG. 1.

With reference to FIG. 8, the base station 50 includes a data controller 51, a transmitter 52, a receiver 53, a clock signal generator 54, a duplexer 55, and an antenna 56.

The transmitter 52 has a plurality of spreading circuits 520a, 520b, . . . , and 520m corresponding to the terminal stations respectively. The transmitter 52 also has an RF modulator 521. The input sides of the spreading circuits 520a, 520b, . . . , and 520m are connected to the data controller 51 via a bus line 511. The output sides of the spreading circuits 520a, 520b, . . . , and 520m are connected to the input side of the RF modulator 521. The output side of the RF modulator 521 is connected to the antenna 56 via an RF power amplifier (not shown) and the duplexer 55. The spreading circuits 520a, 520b, . . . , and 520m are connected to the clock signal generator 54.

The receiver 53 has a plurality of rake-type detecting circuits 530a, 530b, . . . , and 530m corresponding to the terminal stations respectively. The receiver 53 also has an RF demodulating circuit (an RF demodulator) 531. The input side of the RF demodulating circuit 531 is connected to the antenna 56 via a receiver front end (not shown) and the duplexer 55. The input sides of the detecting circuits 530a, 530b, . . . , and 530m are connected to the output side of the RF demodulating circuit 531. The output sides of the detecting circuits 530a, 530b, . . . , and 530m are connected to the data controller 51 via a bus line 512. The detecting circuits 530a, 530b, . . . , and 530m are also connected to the clock signal generator 54.

Figure 9:
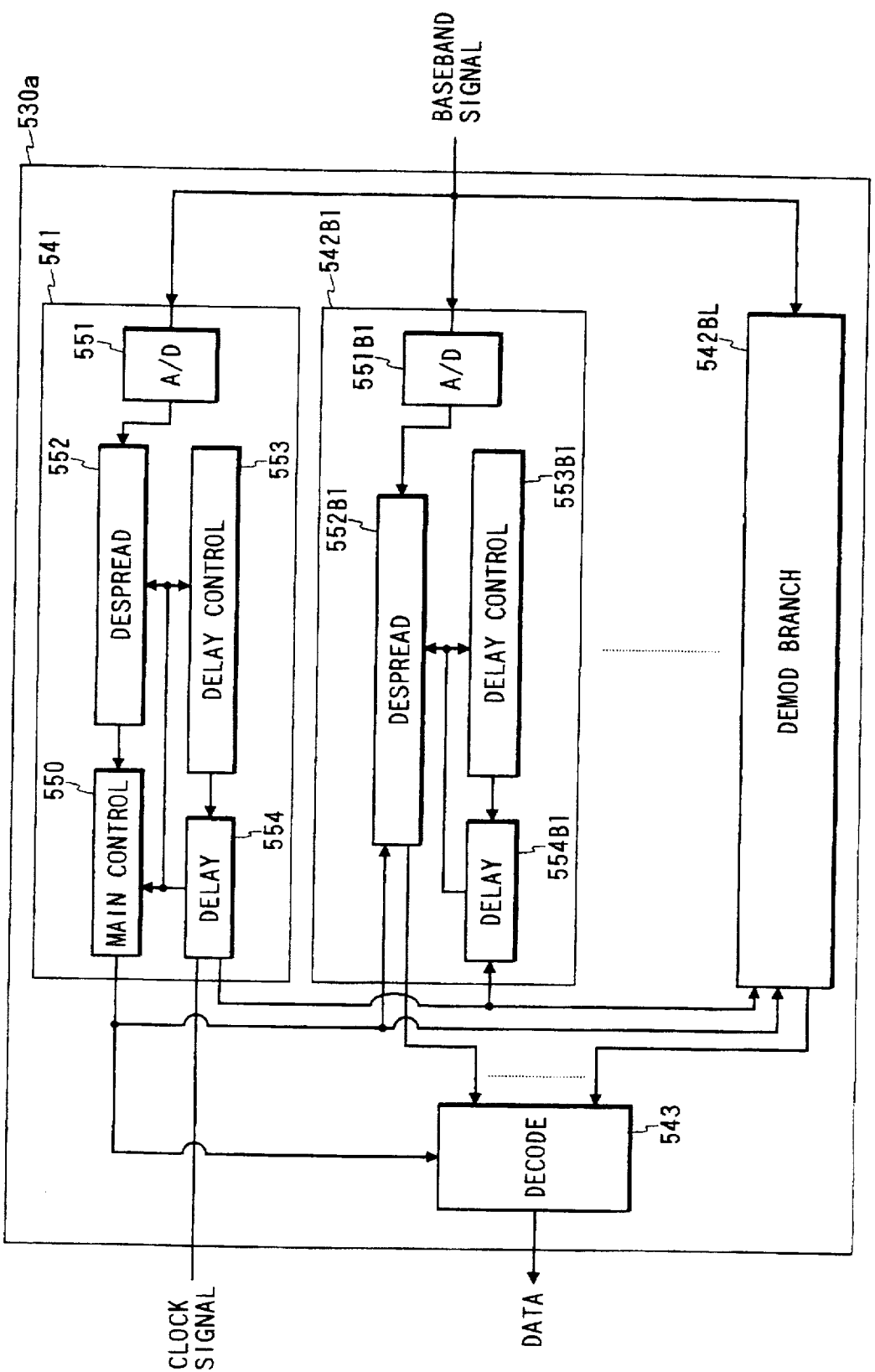
FIG. 9 is a block diagram of a detecting circuit in the base station of FIG. 8.

The detecting circuits 530a, 530b, . . . , and 530m are similar to each other. Only the detecting circuit 530a will now be described in detail. As shown in FIG. 9, the detecting circuit 530a has a correlation position detector 541 and demodulating branches 542B1, 542B2, . . . , and 542BL. The detecting circuit 530a also has a decoding circuit 543. The input side of the correlation position detector 541 is connected to the output side of the RF demodulating circuit 531. The input sides of the demodulating branches 542B1, 542B2, . . . , and 542BL are connected to the output side of the RF demodulating circuit 531. The correlation position detector 541 is connected to the decoding circuit 543. The output sides of the demodulating branches 542B1, 542B2, . . . , and 542BL are connected to the input side of the decoding circuit 543. The correlation position detector 541 is connected to the clock signal generator 54. The demodulating branches 542B1, 542B2, . . . , and 542BL are connected to the correlation position detector 541. The decoding circuit 543 is connected to the data controller 51.

As shown in FIG. 9, the correlation position detector 541 has a main controller 550, an A/D converter 551, a despreading circuit 552, a delay controller 553, and a variable delay circuit 554. The input side of the A/D converter 551 is connected to the output side of the RF demodulating circuit 531. The output side of the A/D converter 551 is connected to the despreading circuit 552. The despreading circuit 552 is connected to the main controller 550 and the delay circuit 554. The delay controller 553 is connected to the delay circuit 554 and the despreading circuit 552. The main controller 550 is connected to the delay circuit 554. The main controller 550 is also connected to the decoding circuit 543 and the demodulating branches 542B1, 542B2, . . . , and 542BL. The delay circuit 554 is also connected to the demodulating branches 542B1, 542B2, . . . , and 542BL.

The demodulating branches 542B1, 542B2, . . . , and 542BL are similar to each other. Only the demodulating branch 542B1 will now be described in detail. As shown in FIG. 9, the demodulating branch 542B1 has an A/D converter 551B1, a despreading circuit 552B1, a delay controller 553B1, and a variable delay circuit 554B1. The input side of the A/D converter 551B1 is connected to the output side of the RF demodulating circuit 531. The output side of the A/D converter 551B1 is connected to the despreading circuit 552B1. The despreading circuit 552B1 is connected to the delay circuit 554B1. The despreading circuit 552B1 is also connected to the decoding circuit 543 and the main controller 550 in the correlation position detector 541. The delay controller 553B1 is connected to the despreading circuit 552B1 and the delay circuit 554B1. The delay circuit 554B1 is connected to the delay circuit 554 in the correlation position detector 541.

The transmitting side of the base station 50 operates as follows. The base station 50 receives input data pieces which should be transmitted from the base station 50 to the terminal stations respectively. The input data pieces are fed via the data controller 51 to the spreading circuits 520a, 520b, . . . , and 520m respectively. The data controller 51 subjects the input data pieces to a given process corresponding to digital modulation such as PSK modulation or QPSK modulation. The clock signal generator 54 produces a clock signal having a predetermined fixed frequency. The clock signal generator 54 outputs the clock signal to the spreading circuits 520a, 520b, . . . , and 520m. Each of the spreading circuits 520a, 520b, . . . , and 520m includes a generator which produces a pseudo-noise code (a spread code) in response to the clock signal. The produced pseudo-noise code agrees with a pseudo-noise code assigned to the corresponding terminal station. Each of the spreading circuits 520a, 520b, . . . , and 520m includes a multiplier or a mixer which converts the input data piece into a base-band spread-spectrum information signal in response to the pseudo-noise code. The spreading circuits 520a, 520b, . . . , and 520m output the base-band spread-spectrum information signals to the RF modulator 521. The RF modulator 521 combines the base-band spread-spectrum information signals and modulates an RF carrier in accordance with the combination of the base-band spread-spectrum information signals, thereby converting the combination of the base-band spread-spectrum information signals into an RF spread-spectrum information signal. The RF spread-spectrum information signal is fed from the RF modulator 521 to the antenna 56 via the RF power amplifier and the duplexer 55. The RF spread-spectrum information signal is radiated from the antenna 56.

The receiving side of the base station 50 operates as follows. RF spread-spectrum information signals transmitted from the terminal stations are caught by the antenna 56, being fed from the antenna 56 to the RF demodulating circuit 531 via the duplexer 55 and the receiver front end. The RF demodulating circuit 531 subjects the RF spread-spectrum information signals to RF demodulation, and thereby converts the RF spread-spectrum information signals into a composite base-band spread-spectrum information signal. The RF demodulating circuit 531 outputs the composite base-band spread-spectrum information signal to the detecting circuits 530a, 530b, ..., and 530m.

The detecting circuits 530a, 530b, ..., and 530m operate similarly to each other. Only operation of the detecting circuit 530a will now be described in detail. In the detecting circuit 530a, the composite base-band spread-spectrum information signal is applied to the A/D converter 551 of the correlation position detector 541. The A/D converter 551 changes the composite base-band spread-spectrum information signal into a corresponding digital version. The A/D converter 551 may use the output signal of the delay circuit 554 as a sample timing control signal. The A/D converter 551 outputs the digital version of the composite base-band spread-spectrum information signal to the despreading circuit 552. The despreading circuit 552 detects a correlation between the composite base-band spread-spectrum information signal and a code pattern fed from the main controller 550. The despreading circuit 552 informs the main controller 550 of the detected correlation.

The delay circuit 554 receives the clock signal from the clock signal generator 54, and delays the clock signal by an interval depending on a control signal fed from the delay controller 553. The delay circuit 554 outputs the delay-resultant clock signal to the main controller 550. In addition, the delay circuit 554 outputs the delay-resultant clock signal to the delay circuits in the demodulating branches 542B1, 542B2, ..., and 542BL.

The main controller 550 generates a reference code (a pseudo-noise code) in response to the output signal of the delay circuit 554. The main controller 550 sequentially circulates the reference code bit by bit (symbol by symbol), and thereby produces a periodically-changed code pattern on the basis of the reference code. The main controller 550 outputs the produced code pattern to the despreading circuit 552. Thus, different code patterns are sequentially applied to the despreading circuit 552 from the main controller 550. The main controller 550 sequentially receives detected correlations from the despreading circuit 552 which correspond to the different code patterns respectively. The main controller 550 compares the detected correlations and arranges the detected correlations by magnitude before storing them into an internal memory. After one cycle of circulation of the reference code has been completed, the main controller 550 controls the delay controller 553 to adjust the amount of delay provided by the delay circuit 554 while the code pattern corresponding to the maximum correlation continues to be used. Then, the main controller 550 generates different code patterns by the previously-indicated circulating technique, and sequentially applies the different code patterns to the despreading circuit 552. The main controller 550 sequentially receives detected correlations from the despreading circuit 552 which correspond to the different code patterns respectively. The main controller 550 compares the detected correlations and arranges the detected correlations by magnitude before storing them into the internal memory. The main controller 550 informs the demodulating branches 542B1, 542B2, ..., and 542BL of code patterns corresponding to greater correlations respectively.

The demodulating branches 542B1, 542B2, ..., and 542BL operate similarly to each other. Only operation of the demodulating branch 542B1 will now be described in detail. In the demodulating branch 542B1, the composite base-band spread-spectrum information signal is applied to the A/D converter 551B1. The A/D converter 551B1 changes the composite base-band spread-spectrum information signal into a corresponding digital version. The A/D converter 551B1 may use the output signal of the delay circuit 554B1 as a sample timing control signal. The A/D converter 551B1 outputs the digital version of the composite base-band spread-spectrum information signal to the despreading circuit 552B1. The despreading circuit 552B1 detects a correlation between the composite base-band spread-spectrum information signal and a code pattern fed from the main controller 550 of the correlation position detector 541.

The delay circuit 554B1 receives the output signal of the delay circuit 554 in the correlation position detector 541, and delays the output signal of the delay circuit 554 by an interval depending on a control signal fed from the delay controller 553B1. The delay circuit 554B1 outputs the delay-resultant clock signal to the despreading circuit 552B1. In the despreading circuit 552B1, a timing of the code pattern is determined by the delay-resultant clock signal. The despreading circuit 552B1 informs the delay controller 553B1 of the detected correlation. The delay controller 553B1 controls the delay circuit 554B1 to maximize the detected correlation. The despreading circuit 552B1 converts the composite base-band spread-spectrum information signal into a non-spread information signal in response to the code pattern (the pseudo-noise code). The despreading circuit 552B1 outputs the non-spread information signal to the decoding circuit 543.

The decoding circuits 543 receives the non-spread information signals from the modulating branches 542B1, 542B2, ..., and 542BL. The decoding circuits 543 weights the non-spread information signals in response to information fed from the main controller 550 within the correlation position detector 541. The decoding circuit 543 combines the weighting-resultant information signals into a composite non-spread information signal. The decoding circuit 543 subjects the composite non-spread information signal to a given process corresponding to digital demodulation such as PSK demodulation or QPSK demodulation, and thereby recovers original data from the non-spread information signal. The decoding circuit 543 feeds the recovered original data to the data controller 51, and then the recovered original data is outputted from the data controller 51.

Seventh Embodiment

A seventh embodiment of this invention is similar to the sixth embodiment except that modulating branches 542C1, 542C2, ..., and 542CL replace the modulating branches 542B1, 542B2, ..., and 542BL of FIG. 9.

Figure 10:
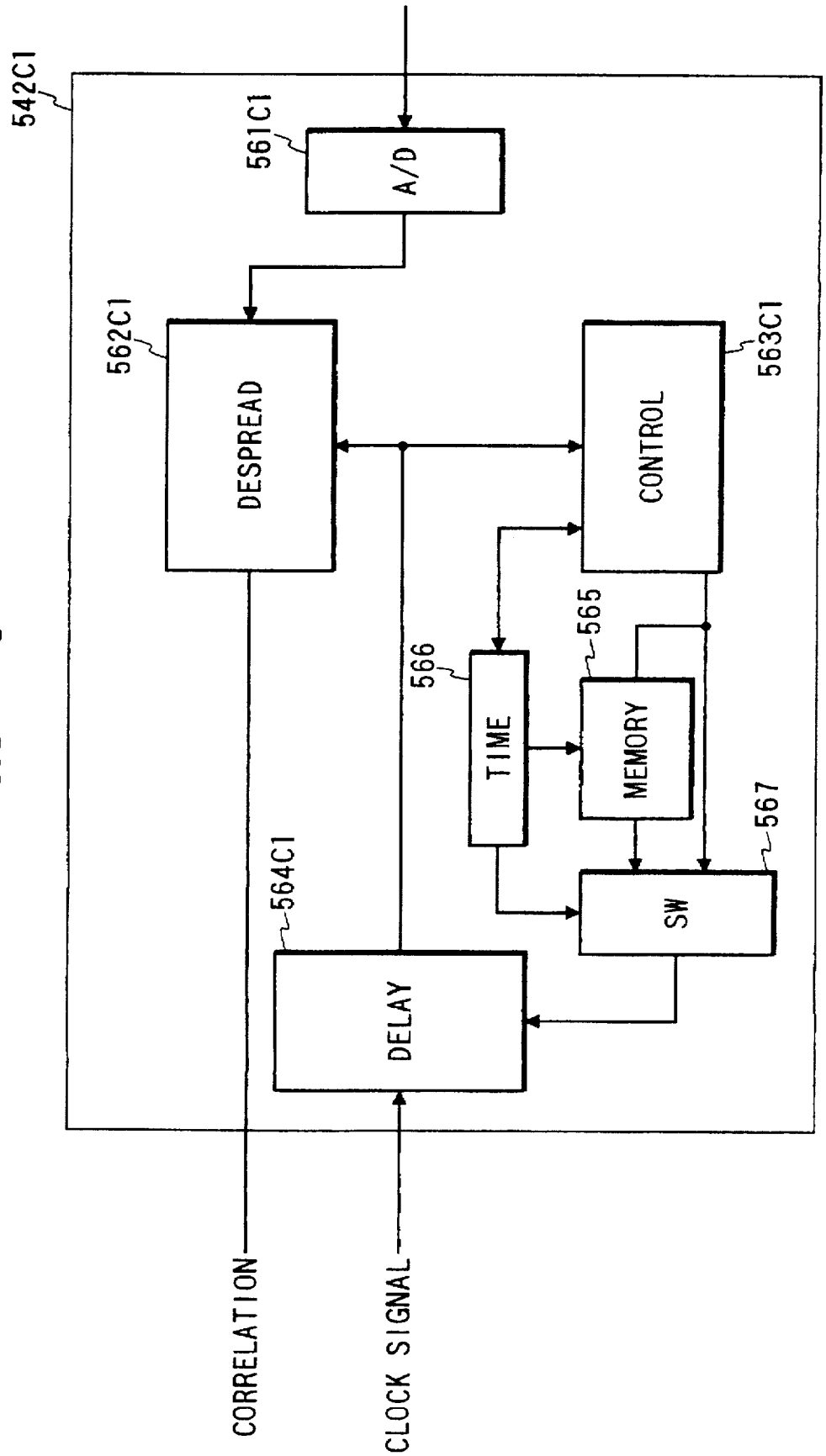
FIG. 10 is a block diagram of a demodulating branch in a direct-sequence spread-spectrum communication system according to a seventh embodiment of this invention.

The demodulating branches 542C1, 542C2, ..., and 542CL are similar to each other. Only the demodulating branch 542C1 will now be described in detail. As shown in FIG. 10, the demodulating branch 542C1 has an A/D converter 561C1, a despreading circuit 562C1, a delay controller 563C1, a variable delay circuit 564C1, a memory 565, a time measurement circuit 566, and a switch 567.

The input side of the A/D converter 561C1 is connected to the output side of an RF demodulating circuit 531 (see FIG. 8). The output side of the A/D converter 561C1 is connected to the despreading circuit 562C1. The despreading circuit 562C1 is connected to the delay circuit 564C1. The despreading circuit 562C1 is also connected to a decoding circuit 543 (see FIG. 9) and a main controller 550 in a correlation position detector 541 (see FIG. 9). The delay controller 563C1 is connected to the despreading circuit 562C1 and the delay circuit 564C1. The delay circuit 564C1 is connected to a delay circuit 554 in the correlation position detector 541 (see FIG. 9). The time measurement circuit 566 is connected to the delay controller 563C1, the memory 565, and the switch 567. The memory 565 is connected to the delay controller 563C1 and the switch 567. The switch 567 is connected to the delay controller 563C1 and the delay circuit 564C1.

The demodulating branches 542C1, 542C2, . . . , and 542CL operate similarly to each other. Only operation of the demodulating branch 542C1 will now be described in detail. In the demodulating branch 542C1, a composite base-band spread-spectrum information signal is applied to the A/D converter 561C1. The A/D converter 561C1 changes the composite base-band spread-spectrum information signal into a corresponding digital version. The A/D converter 561C1 may use the output signal of the delay circuit 564C1 as a sample timing control signal. The A/D converter 561C1 outputs the digital version of the composite base-band spread-spectrum information signal to the despreading circuit 562C1. The despreading circuit 562C1 detects a correlation between the composite base-band spread-spectrum information signal and a code pattern fed from the main controller 550 of the correlation position detector 541 (see FIG. 9).

The delay circuit 564C1 receives the output signal of the delay circuit 554 in the correlation position detector 541 (see FIG. 9), and delays the output signal of the delay circuit 554 by an interval depending on a control signal fed from the switch 567. The delay circuit 564C1 outputs the delay-resultant clock signal to the despreading circuit 562C1. In the despreading circuit 562C1, a timing of the code pattern is determined by the delay-resultant clock signal. The despreading circuit 562C1 informs the delay controller 563C1 of the detected correlation. The delay controller 563C1 generates and outputs information of a desired delay amount in response to the detected correlation.

During a synchronization acquiring process, the time measurement circuit 566 enables the switch 567 to select the output signal of the delay controller 563C1 and to feed the output signal of the delay controller 563C1 to the delay circuit 564C1. The delay circuit 564C1 is thus controlled to maximize the detected correlation. During the synchronization acquiring process, the delay controller 563C1 stores the delay-amount information into the memory 565 and updates the delay-amount information therein time to time.

When the delay amount corresponding to the maximum correlation has been decided, the delay controller 563C1 starts a synchronization tracking mode of operation. At the same time, the time measurement circuit 566 falls into a stand-by state. During a synchronization tracking process, the delay controller 563C1 receives the detected correlation between the composite base-band spread-spectrum information signal and the code pattern, and temporally averages the detected correlation over a given time. The delay controller 563C1 memorizes the resultant average correlation, and periodically updates the memorized average correlation.

When the average correlation drops below a given reference level, the delay controller 563C1 suspends the synchronization tracking process and restarts the synchronization acquiring process. In this case the delay controller 563C1 outputs a trigger signal to the time measurement circuit 566. The time measurement circuit 566 starts to measure a time elapsed in response to the trigger signal. At the same time, the time measurement circuit 566 controls the memory 565 to inhibit the updating of information in the memory 565. In addition, the time measurement circuit 566 enables the switch 567 to select the output signal of the memory 565 and to feed the output signal of the memory 565 to the delay circuit 564C1. The delay controller 563C1 continues to be informed of the detected correlation between the composite base-band spread-spectrum information signal and the code pattern. The delay controller 563C1 determines whether or not the detected correlation is in a predetermined allowable range defined with respect to the average correlation generated during the synchronization tracking process. When the detected correlation is in the predetermined allowable range, the delay controller 563C1 restarts the synchronization tracking process. When the detected correlation is outside the predetermined allowable range, the delay controller 563C1 continues the synchronization acquiring process.

In the case where the elapsed time measured by the time measurement circuit 566 reaches a given time, the time measurement circuit 566 controls the memory 565 to enable the updating of information in the memory 565. In addition, the time measurement circuit 566 enables the switch 567 to select the output signal of the delay controller 563C1 and to feed the output signal of the delay controller 563C1 to the delay circuit 564C1.

The despreading circuit 562C1 converts the composite base-band spread-spectrum information signal into a non-spread information signal in response to the code pattern (the pseudo-noise code). The despreading circuit 562C1 outputs the non-spread information signal to the decoding circuit 543 (see FIG. 9).

Eighth Embodiment

Figure 12:
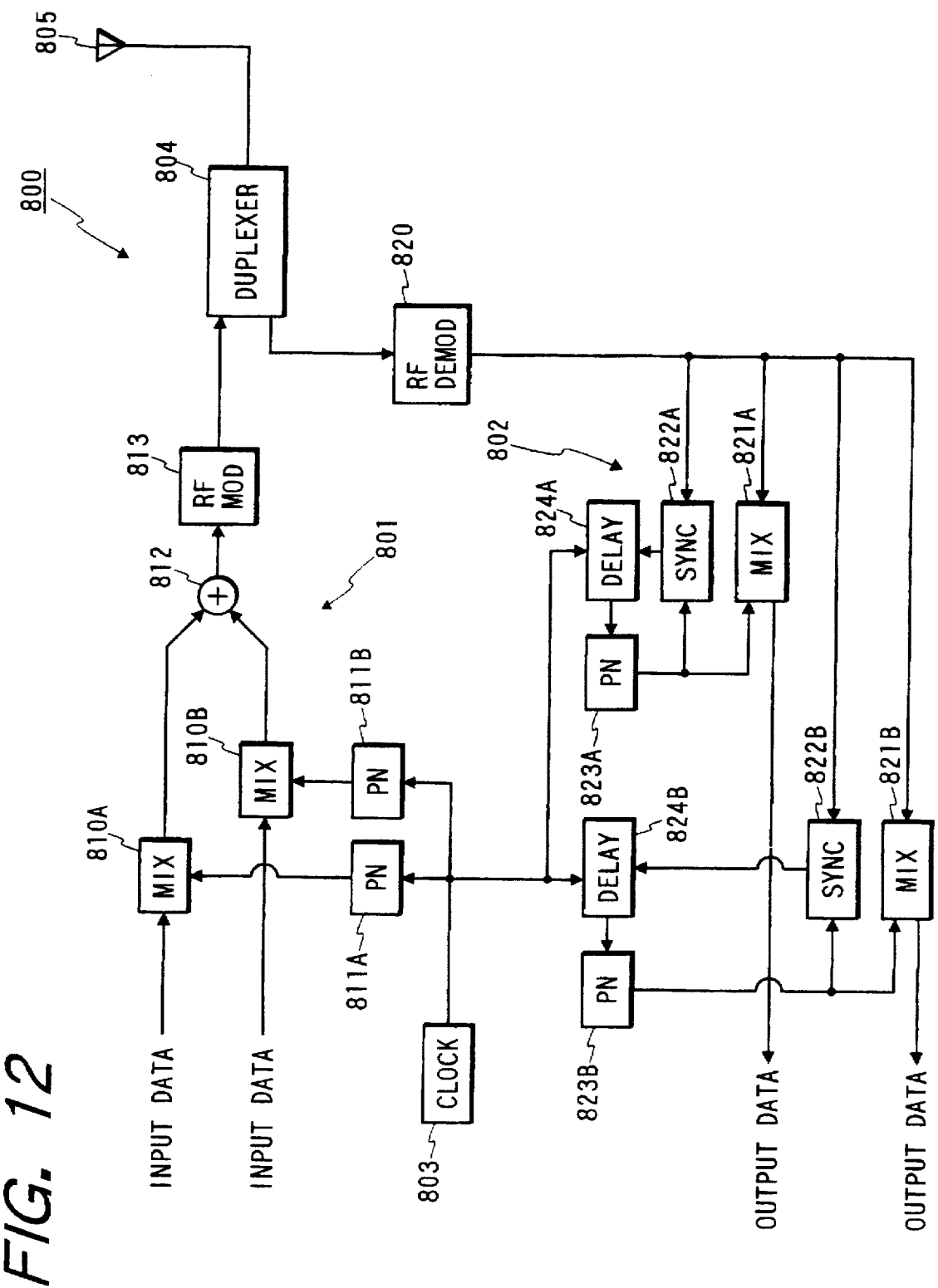
FIG. 12 is a block diagram of a base station in a direct-sequence spread-spectrum communication system according to an eighth embodiment of this invention.

An eighth embodiment of this invention is similar to the first embodiment except for design changes indicated hereinafter. FIG. 12 shows a base station 800 in a direct-sequence spread-spectrum communication system according to the eighth embodiment. The base station 800 is able to communicate with a plurality of terminal stations similar to the terminal station 20 of FIG. 1.

With reference to FIG. 12, the base station 800 includes a transmitter 801, a receiver 802, a clock signal generator 803, a duplexer 804, and an antenna 805.

The transmitter 801 has mixers (multipliers) 810A and 810B, pseudo-noise code generators 811A and 811B, a summing circuit 812, and an RF modulator 813. The mixers 810A and 810B receive first and second input data pieces to be transmitted to the terminal stations respectively. The pseudo-noise code generators 811A and 811B are connected to the clock signal generator 803. The pseudo-noise code generators 811A and 811B are also connected to the mixers 810A and 810B. The output terminals of the mixers 810A and 810B are connected to input terminals of the summing circuit 812 respectively. The output side of the summing circuit 812 is connected to the input side of the RF modulator 813. The output side of the RF modulator 813 is connected to the antenna 805 via an RF power amplifier (not shown) and the duplexer 804.

The receiver 802 has an RF demodulator 820, mixers (multipliers) 821A and 821B, synchronizing sections 822A and 822B, pseudo-noise code generators 823A and 823B, variable delay circuits 824A and 824B. The input side of the RF demodulator 820 is connected to the antenna 805 via a receiver front end (not shown) and the duplexer 804. The output side of the RF demodulator 820 is connected to the mixers 821A and 821B and the synchronizing sections 822A and 822B. The pseudo-noise code generators 823A and 823B are connected to the mixers 821A and 821B respectively. The pseudo-noise code generators 823A and 823B are connected to the synchronizing sections 822A and 822B respectively. The synchronizing sections 822A and 822B are connected to control terminals of the delay circuits 824A and 824B respectively. The output side of the delay circuits 824A and 824B are connected to the pseudo-noise code generators 823A and 823B respectively. The input sides of the delay circuits 824A and 824B are connected to the clock signal generator 803.

The transmitting side of the base station 800 operates as follows. The first and second input data pieces are applied to the mixers 810A and 810B respectively. The clock signal generator 803 produces a clock signal having a predetermined fixed frequency. The clock signal generator 803 outputs the clock signal to the pseudo-noise code generators 811A and 811B. The pseudo-noise code generators 811A and 811B produce first and second spread codes (pseudo-noise codes) at timings determined by the clock signal respectively. The first and second spread codes produced by the pseudo-noise code generators 811A and 811B agree with spread codes assigned to the terminal stations respectively. The pseudo-noise code generators 811A and 811B output the produced first and second spread codes to the mixers 810A and 810B respectively. The mixer 810A multiplies or mixes the first input data piece and the first spread code, thereby spreading the first input data piece into a first base-band spread-spectrum information signal in response to the first spread code. The mixer 810B multiplies or mixes the second input data piece and the second spread code, thereby spreading the second input data piece into a second base-band spread-spectrum information signal in response to the second spread code. The mixers 810A and 810B output the first and second base-band spread-spectrum information signals to the summing circuit 812. The summing circuit 812 combines the first and second base-band spread-spectrum information signals into a composite base-band spread-spectrum information signal. The summing circuit 812 outputs the composite base-band spread-spectrum information signal to the RF modulator 813. The RF modulator 813 modulates an RF carrier in accordance with the composite base-band spread-spectrum information signal, thereby converting the composite base-band spread-spectrum information signal into an RF spread-spectrum information signal. The RF spread-spectrum information signal is fed from the RF modulator 813 to the antenna 805 via the RF power amplifier and the duplexer 804. The RF spread-spectrum information signal is radiated from the antenna 805.

The receiving side of the base station 800 operates as follows. RF spread-spectrum information signals transmitted from the terminal stations are caught by the antenna 805, being fed from the antenna 805 to the RF demodulator 820 via the duplexer 804 and the receiver front end. The RF demodulator 820 subjects the RF spread-spectrum information signals to frequency down conversion, thereby changing the RF spread-spectrum information signals into a composite base-band spread-spectrum information signal. The RF demodulator 820 outputs the composite base-band spread-spectrum information signal to the mixers 821A and 821B and the synchronizing sections 822A and 822B. The pseudo-noise code generators 823A and 823B produce first and second spread codes (pseudo-noise codes) assigned to the terminal stations respectively. The pseudo-noise code generators 823A and 823B output the produced first and second spread codes to the mixers 821A and 821B respectively. The mixer 821A multiplies or mixes the composite base-band spread-spectrum information signal and the first spread code, thereby despreading the composite base-band spread-spectrum information signal into a first output data piece in response to the first spread code. The mixer 821B multiplies or mixes the composite base-band spread-spectrum information signal and the second spread code, thereby despreading the composite base-band spread-spectrum information signal into a second output data piece in response to the second spread code. The mixers 821A and 821B output the first and second output data pieces respectively.

Synchronization between the first spread code and the composite base-band spread-spectrum information signal applied to the mixer 821A is acquired and maintained as follows. The delay circuit 824A is preferably of one of known types. The delay circuit 824A receives the clock signal from the clock signal generator 803. The delay circuit 824A delays the clock signal by an interval depending on an output signal of the synchronizing section 822A. The delay circuit 824A outputs the delay-resultant clock signal to the pseudo-noise code generator 823A. The pseudo-noise code generator 823A produces the first spread code at a timing determined by the delay-resultant clock signal. The synchronizing section 822A is preferably of one of known types. The synchronizing section 822A includes a known sync acquisition circuit and a known sync tracking circuit. The synchronizing section 822A includes a correlator which detects a correlation between the composite base-band spread-spectrum information signal and the first spread code outputted from the pseudo-noise code generator 823A. During a synchronization acquiring process, the synchronizing section 822A generates a synchronization acquiring signal in response to the detected correlation in a known manner, and outputs the synchronization acquiring signal to the delay circuit 824A. Accordingly, the amount of delay provided by the delay circuit 824A is controlled in response to the synchronization acquiring signal. The timing of generation of the first spread code by the pseudo-noise code generator 823A is thus adjusted in response to the synchronization acquiring signal. This timing control of the first spread code acquires the synchronization between the first spread code and the composite base-band spread-spectrum information signal. During a synchronization tracking process which follows the synchronization acquiring process, the synchronizing section 822A generates a synchronization tracking signal in response to the detected correlation in a known manner, and outputs the synchronization tracking signal to the delay circuit 824A. Accordingly, the amount of delay provided by the delay circuit 824A is controlled in response to the synchronization tracking signal. The timing of generation of the first spread code by the pseudo-noise code generator 823A is thus adjusted in response to the synchronization tracking signal. This timing control of the first spread code maintains the synchronization between the first spread code and the composite base-band spread-spectrum information signal.

Synchronization between the second spread code and the composite base-band spread-spectrum information signal applied to the mixer 821B is acquired and maintained as follows. The delay circuit 824B is preferably of one of known types. The delay circuit 824B receives the clock signal from the clock signal generator 803. The delay circuit 824B delays the clock signal by an interval depending on an output signal of the synchronizing section 822B. The delay circuit 824B outputs the delay-resultant clock signal to the pseudo-noise code generator 823B. The pseudo-noise code generator 823B produces the second spread code at a timing determined by the delay-resultant clock signal. The synchronizing section 822B is preferably of one of known types. The synchronizing section 822B includes a known sync acquisition circuit and a known sync tracking circuit. The synchronizing section 822B includes a correlator which detects a correlation between the composite base-band spread-spectrum information signal and the second spread code outputted from the pseudo-noise code generator 823B. During a synchronization acquiring process, the synchronizing section 822B generates a synchronization acquiring signal in response to the detected correlation in a known manner, and outputs the synchronization acquiring signal to the delay circuit 824B. Accordingly, the amount of delay provided by the delay circuit 824B is controlled in response to the synchronization acquiring signal. The timing of generation of the second spread code by the pseudo-noise code generator 823B is thus adjusted in response to the synchronization acquiring signal. This timing control of the second spread code acquires the synchronization between the second spread code and the composite base-band spread-spectrum information signal. During a synchronization tracking process which follows the synchronization acquiring process, the synchronizing section 822B generates a synchronization tracking signal in response to the detected correlation in a known manner, and outputs the synchronization tracking signal to the delay circuit 824B. Accordingly, the amount of delay provided by the delay circuit 824B is controlled in response to the synchronization tracking signal. The timing of generation of the second spread code by the pseudo-noise code generator 823B is thus adjusted in response to the synchronization tracking signal. This timing control of the second spread code maintains the synchronization between the second spread code and the composite base-band spread-spectrum information signal.

What is claimed is:

1. A receiver in a base station of a direct-sequence spread-spectrum communication system, comprising:

a clock signal generator producing a basic clock signal;

first means connected to the clock signal generator for delaying the basic clock signal by an adjustable interval and thereby converting the basic clock signal into a delay-resultant clock signal;

second means connected to the first means for generating a pseudo-noise code at a timing depending on the delay-resultant clock signal;

third means connected to the second means for despreading a spread-spectrum information signal into a non-spread information signal in response to the pseudo-noise code generated by the second means;

fourth means connected to the second means for detecting a correlation between the spread-spectrum information signal and the pseudo-noise code generated by the second means; and fifth means connected to the first means and the fourth means for controlling the adjustable interval in response to the correlation detected by the fourth means to provide synchronization between the spread-spectrum information signal and the pseudo-noise code generated by the second means.

2. A receiver in a base station of a direct-sequence spread-spectrum communication system, comprising:

a clock signal generator producing a basic clock signal;

first means connected to the clock signal generator for delaying the basic clock signal by a first adjustable interval and thereby converting the basic clock signal into a first delay-resultant clock signal;

second means connected to the first means for generating a first pseudo-noise code at a timing depending on the first delay-resultant clock signal;

third means connected to the second means for despreading a spread-spectrum information signal into a first non-spread information signal in response to the first pseudo-noise code generated by the second means;

fourth means connected to the second means for detecting a correlation between the spread-spectrum information signal and the first pseudo-noise code generated by the second means;

fifth means connected to the first means and the fourth means for controlling the first adjustable interval in response to the correlation detected by the fourth means to provide synchronization between the spread-spectrum information signal and the first pseudo-noise code generated by the second means;

sixth means connected to the clock signal generator for delaying the basic clock signal by a second adjustable interval and thereby converting the basic clock signal into a second delay-resultant clock signal;

seventh means connected to the sixth means for generating a second pseudo-noise code at a timing depending on the second delay-resultant clock signal;

eighth means connected to the seventh means for despreading the spread-spectrum information signal into a second non-spread information signal in response to the second pseudo-noise code generated by the seventh means;

ninth means connected to the seventh means for detecting a correlation between the spread-spectrum information signal and the second pseudo-noise code generated by the seventh means; and tenth means connected to the sixth means and the ninth means for controlling the second adjustable interval in response to the correlation detected by the ninth means to provide synchronization between the spread-spectrum information signal and the second pseudo-noise code generated by the seventh means.

3. A direct-sequence spread-spectrum communication system comprising:

a base station; and a terminal performing direct-sequence spread-spectrum communication with the base station by using code division multiple access;

the terminal including a receiving section, a transmitting section, and a controlling section, wherein the receiving section in the terminal includes a synchronization tracking circuit for reproducing a code clock signal on the basis of a signal received from the base station, wherein the transmitting section in the terminal transmits a signal on the basis of the reproduced code clock signal, and wherein the controlling section in the terminal controls the receiving section and the transmitting section in the terminal and performs signal processing;

the base station including a transmitting section and a synchronization tracking circuit, wherein the transmitting section in the base station transmits a signal by using a self reference clock signal, wherein the synchronization tracking circuit in the base station performs clock signal reproduction, and wherein the synchronization tracking circuit in the base station includes a delay circuit for delaying the self reference clock signal to maximize a correlation between a received signal and a reference code.

4. The direct-sequence spread-spectrum communication system of claim 3, wherein the receiving section in the base station includes receiving circuits corresponding to terminals respectively, and each of the receiving circuits includes a delay circuit for delaying a base-station reference clock signal to maximize a correlation between a received signal and a reference code.

5. The direct-sequence spread-spectrum communication system of claim 3, wherein the delay circuit includes a plurality of sub delay circuits and means for selecting one of output signals of the sub delay circuits and changing the signal selection to vary a delay amount.

6. The direct-sequence spread-spectrum communication system of claim 3, wherein the delay circuit provides a variable delay amount and includes a sub delay circuit of a variable delay type and a waveform processing circuit following the sub delay circuit.

7. The direct-sequence spread-spectrum communication system of claim 3, wherein the delay circuit provides a variable delay amount and includes a low pass filter having a variable time constant and a waveform shaping circuit following the low pass filter.

8. A direct-sequence spread-spectrum communication system comprising:

a base station; and a terminal performing direct-sequence spread-spectrum communication with the base station by using code division multiple access;

the terminal including a receiving section, a transmitting section, and a controlling section, wherein the receiving section in the terminal includes a synchronization tracing circuit for reproducing a code clock signal on the basis of a signal received from the base station, wherein the transmitting section in the terminal transmits a signal on the basis of the reproduced code clock signal, and wherein the controlling section in the terminal controls the receiving section and the transmitting section in the terminal and performs signal processing;

the base station including a transmitting section, a receiving section, and a controlling section, wherein the transmitting section in the base station transmits a signal by using a self reference clock signal, wherein the receiving section in the base station includes receiving circuits corresponding to terminals respectively, wherein the receiving section in the base station includes signal processing circuits of a rake type for the receiving circuits respectively, wherein each of the signal processing circuits includes a delay circuit for delaying the self reference clock signal to maximize a correlation between a received signal and a reference code, and wherein the controlling section in the base station controls the receiving section and the transmitting section in the base station and performs signal processing, wherein each of the signal processing circuits includes a delay circuit for delaying the self reference clock signal to maximize a correlation between a received signal and a reference code, wherein each of the signal processing circuits includes a memory storing information of a delay time related to the clock signal, wherein when a received power or a correlation temporarily drops, a clock signal maintained for the delay time stored in the memory is used by one or more of the signal processing circuits during a predetermined fixed time, wherein the stored delay time and a clock timing are not changed in cases where the received power or the correlation returns to an original level in a given time after dropping temporarily, and wherein a delay time corresponding to a maximum correlation is detected again in cases where the received power or the correlation does not return to an original level in a given time after dropping temporarily.

\* \* \* \* \*